United States Patent [19]
Glass et al.

[11] Patent Number: 6,161,097
[45] Date of Patent: Dec. 12, 2000

[54] AUTOMATED TRAFFIC MANAGEMENT SYSTEM AND METHOD

[75] Inventors: Brian J. Glass, Palo Alto; Liljana Spirkovska, Sunnyvale; William J. McDermott, Menlo Park; Ronald J. Reisman, Palo Alto; James Gibson, Campbell; David L. Iverson, Sunnyvale, all of Calif.

[73] Assignee: The United Sates of America as represented by the Administrator of the National Aeronautics and Space Administration, Washington, D.C.

[21] Appl. No.: 09/090,812

[22] Filed: Jun. 4, 1998

Related U.S. Application Data

[63] Continuation-in-part of application No. 08/908,105, Aug. 11, 1997, abandoned.

[51] Int. Cl.[7] .............................. G08G 5/04; G08G 5/06; G08G 7/00
[52] U.S. Cl. ................................. 705/6; 342/23; 342/33; 342/36; 342/456; 701/120; 701/117
[58] Field of Search .................................. 705/6; 345/23, 345/33, 36, 385, 456; 701/120, 117, 118, 119, 122

[56] References Cited

U.S. PATENT DOCUMENTS

| | | | |
|---|---|---|---|
| 4,979,137 | 12/1990 | Gerstenfeld et al. | 701/120 |
| 5,216,611 | 6/1993 | McElreath | 701/221 |

(List continued on next page.)

FOREIGN PATENT DOCUMENTS

| | | | |
|---|---|---|---|
| 0 613 110 A1 | 8/1994 | European Pat. Off. | G08G 5/06 |
| 0 714 082 A2 | 5/1996 | European Pat. Off. | G08G 5/06 |
| 0 785 536 A1 | 7/1997 | European Pat. Off. | G08G 5/06 |
| WO 96/02905 | 2/1996 | WIPO | G08G 5/04 |

OTHER PUBLICATIONS

Winter, H. and NuBer, H.–G. (Editors) "Advanced Technologies for Air Traffic Flow Management", Proceedings of an International Seminar Organized by Deutsche Forschungsanstalt fur Luft–und Raumfahrt (DLR), Bonn, Germany, Apr. 1994.

(List continued on next page.)

*Primary Examiner*—Paul R. Lintz
*Assistant Examiner*—John W. Hayes
*Attorney, Agent, or Firm*—Robert M. Padilla; Carla M. Wong; John G. Mannix

[57] ABSTRACT

A data management system and method that enables acquisition, integration and management of real-time data generated at different rates, by multiple, heterogeneous incompatible data sources. The system achieves this functionality by using an expert system to fuse data from a variety of airline, airport operations, ramp control, and air traffic control tower sources, to establish and update reference data values for every aircraft surface operation. The system may be configured as a real-time airport surface traffic management system (TMS) that electronically interconnects air traffic control, airline data and airport operations data to facilitate information sharing and improve taxi queuing. In the TMS operational mode, empirical data shows substantial benefits in ramp operations for airlines, reducing departure taxi times by about one minute per aircraft in operational use, translating as $12 to $15 million per year savings to airlines at the Atlanta, Georgia airport. The data management system and method may also be used for scheduling the movement of multiple vehicles in other applications, such as, marine vessels in harbors and ports, trucks or railroad cars in ports or shipping yards, and railroad cars in switching yards. Finally, the data management system and method may be used for managing containers at a shipping dock, stock on a factory floor or in a warehouse, or as a training tool for improving situational awareness of FAA tower controllers, ramp and airport operators or commercial airline personnel in airfield surface operations.

28 Claims, 10 Drawing Sheets

U.S. PATENT DOCUMENTS

| | | | |
|---|---|---|---|
| 5,519,618 | 5/1996 | Kastner et al. | 701/120 |
| 5,548,515 | 8/1996 | Pilley et al. | 701/120 |
| 5,574,648 | 11/1996 | Pilley | 701/120 |
| 5,623,413 | 4/1997 | Matheson et al. | 705/8 |
| 5,629,691 | 5/1997 | Jain | 342/36 |
| 5,659,475 | 8/1997 | Brown | 701/120 |
| 5,670,961 | 9/1997 | Tomita et al. | 342/36 |
| 5,712,785 | 1/1998 | Mok et al. | 342/36 |
| 5,714,948 | 2/1998 | Farmakis et al. | 701/120 |
| 5,740,047 | 4/1998 | Pilley et al. | 701/120 |
| 5,892,462 | 4/1999 | Tran | 3470/961 |
| 6,044,322 | 3/2000 | Stieler | 701/120 |

OTHER PUBLICATIONS

Meuninck, T.C., titled "Finding the Pulse of the ATC System Heartbeat: A Joint Atlanta Airport/Local FAAA/Aviation Users Adventure", Journal of ATC, Jan.–Mar. 1995, pp. 28, 29.

Talley, R.G. and Cistone, J.A., "ASTA Traffic Planner System Description", Report 4J50–AHD–D001, Martin Marietta Corporation, Management and Data Systems, Dec. 1993.

Davis, T.J., Krzezowski, K.J., and Bergh, C., "The Final Approach Spacing Tool," 13th IFAC Symposium on Automatic Control in Aerospace, Palo Alto, CA, Sep. 1994.

Skaliotis, G. J., "An Independent Survey of AMASS/ASTA Benefits," Report RSPA/VNTSC–FA2P8–PM1, Surveillance and Sensors Division, Volpe National Transportation Systems Center, Cambridge, MA, Dec. 1991.

"FAA Awards Contract for GPS Aviation System", GPS Report, vol. 3, No. 3, Feb. 11, 1993.

Winter, H. and NuBer, H.–G. (Editors) "Advanced Technologies for Air Traffic Flow Management", Proceedings of an International Seminar Organized by Deutsche Forschungsanstalt fur Luft–und Raumfahrt (DLR), Bonn, Germany, Apr. 1994.

Meuninck, T.C., titled "Finding the Pulse of the ATC System Heartbeat: A Joint Atlanta Airport/Local FAAA/Aviation Users Adventure", Journal of ATC, Jan.–Mar. 1995, pp. 28, 29.

Talley, R.G. and Cistone, J.A., "ASTA Traffic Planner System Description", Report 4J50–AHD–D001, Martin Marietta Corporation, Management and Data Systems, Dec. 1993.

Davis, T.J., Krzezowski, K.J., and Bergh, C., "The Final Approach Spacing Tool," 13th IFAC Symposium on Automatic Control in Aerospace, Palo Alto, CA, Sep. 1994.

Skaliotix, G. J., "An Independent Survey of AMASS/ASTA Benefits," Report RSPA/VNTSC–FA2P8–PM1, Surveillance and Sensors Division, Volpe National Transportation Systems Center, Cambridge, MA, Dec. 1991.

AUTOMATED TRAFFIC MANAGEMENT SYSTEM AND METHOD

This application is a continuation-in-part of U.S. Patent application Ser. No. 08/908,105 filed on Aug. 11, 1997 now abandoned.

ORIGIN OF INVENTION

The invention described herein was made in the performance of work under a NASA contract and is subject to the provision of Section 305 of the National Aeronautics and Space Act of 1958, Public Law 85-568 (72 Stat. 435; 42 U.S.C. 2457).

BACKGROUND OF THE INVENTION

1. Technical Field of the Invention

The present invention relates to the field of traffic management, for the scheduling of the movement of plural vehicles. This invention particularly relates to an automated data exchange and fusion system and method, for the optimization of airport surface traffic management. More specifically, the inventive system relates to the management of real-time data generated at different rates, by multiple heterogeneous incompatible data sources, towards the completion of an overall end product or service.

2. Description of the Prior Art

Air traffic, both nationally and internationally, has been increasing significantly and such growth is expected to continue in future years. This increased traffic raises issues relative to airport capacity, surface safety, traffic planning, and surface traffic flow efficiency. Within the United States, many airports are constrained in their ability to expand to meet the need for increased capacity. Most major airports have geographical or environmental/zoning restrictions that prohibit construction of additional runways. Accordingly, added capacity must be achieved through more efficient and safe utilization of existing airport facilities.

Presently, it is the task of the tower ground controller to consider and integrate information from airfield visual cues and a variety of other sources to generate aircraft taxi routings and to configure the airport's taxiways and runways. With the prevalence of hub and spoke airline operations, recurrent departure taxi delays at large airports have become commonplace as large numbers of aircraft attempt to land, taxi to gate, service, taxi to runway, and depart all within 60–90 minute intervals or "banks."

Data transfer between stations in typical U.S. airport tower operations relies upon a combination of voice communications (i.e., radio, telephone) and hand-carried, printed paper strips. Information from non-governmental sources (i.e., from air carriers or ramp management) is not generally available to the tower controller. Similarly, information from the tower controller is not generally available to non-governmental sources. By providing data fusion and automated taxi planning data to the ground controller, he/she can operate with amplified data-gathering and planning abilities. Improved dynamic taxi routing, and hence smoother airport operations with less surface taxi delay, should result. (reference is made to Winter, H. and Nusser, H.-G. (Editors) "Advanced Technologies for Air Traffic Flow Management", Proceedings of an International Seminar Organized by Deutsche Forschungsanstalt fur Luft-und Raumfahrt (DLR), 18 Bonn, Germany, April 1994, pages 191–224.

The largest single component of direct delay cost in the U.S. national airspace system is departure taxi delays, according to the Air Transport Association. The costs of all surface delays are roughly equivalent to all those experienced in other flight control domains (i.e., en-route and the terminal area combined), reported as $1.6 billion in 1995.

Improved airfield surface automation and information sharing has been proposed as a means of potentially improving airport throughput and reducing the losses caused by inefficient taxi and runway queuing. A 1995 Federal Aviation Administration (FAA) study estimated the savings due to simple data-sharing alone as an average of one minute of taxi delay saved per flight operation, at congested hub airports. Reference is made to "Cost-Benefit Analysis to add the SMA to the Tower Control Complex (TCCC) as a Planned Product Improvement," Tower Systems Engineering Group, AUA-400/500, Federal Aviation Administration, Washington, D.C., December 1995.

Other benefits of data sharing include better airport resource allocations. Currently, airlines and airport managers are unaware of the precise location of a given arriving or departing aircraft while it is in terminal area airspace (about 60 nautical mile radius). As aircraft are moved into and out of holding patterns and sequenced for arrival, landing-time uncertainties of ±10 minutes are commonplace, which in turn adversely affects the efficient allocation of gates, servicing equipment, ground crews, etc. For instance, empty gates may be held for missing arrivals while early-arriving aircraft are left waiting for an available gate.

Several attempts have been proposed to automate traffic control and training systems. Recently, work in surface taxi route planning, using a unified gate-to-takeoff taxi planning and route generation approach, has been implemented and tested in Europe by the German TARMAC system (reference is made to Winter, H. and Nusser, H.-G. (Editors) "Advanced Technologies for Air Traffic Flow Management", Proceedings of an International Seminar Organized by Deutsche Forschungsanstalt fur Luftund Raumfahrt (DLR), Bonn, Germany, April 1994. However, in typical U.S. airport operations, aircraft control is distributed between non-governmental entities (i.e., airline, ramp tower) and governmental entities (i.e., tower) depending on a given aircraft's location. For instance, contrary to non-U.S. airport operations, at U.S. airports, airlines generally have the right to pushback any number of aircraft at any given time without regard for the tower's ability to sequence them. Therefore, in the U.S. case, the latitude for pure taxi route optimization is severely constrained compared to Europe and elsewhere, leading to significantly different expectations for data exchange systems.

The article by Meuninck, T. C., titled "Finding the Pulse of the ATC System Heartbeat: A Joint Atlanta Airport/Local FAA/Aviation Users Adventure", Journal of ATC, January––March 1995, pages 28, 29, provides a general description of a test conducted at the Atlanta Airport for managing and measuring the performance of an ATC system. However, the article provides limited implementation design, and the system as actually designed did not provide a comprehensive solution to the control and management of a large number of aircraft from various carriers, nor discernible sharing of data between different domains of control.

The report by Talley, R. G. and Cistone, J. A., "ASTA Traffic Planner System Description", Report 4J50-AHD-D001, Martin Marietta Corporation, Management and Data Systems, December 1993, describes early systems requirements for a ground movement optimization system at airports.

The article by Davis, T. J., Krzeczowski, K. J., and Bergh, C., "The Final Approach Spacing Tool," 13th IFAC Symposium on Automatic Control in Aerospace, Palo Alto, Calif., September 1994, describes a system for assisting terminal area air traffic controllers in the management and control of arrival traffic.

The report by Skaliotis, G. J., "An Independent Survey of AMASS/ASTA Benefits," Report RSPA/VNTSC-FA2P8-PM1, Surveillance and Sensors Division, Volpe National Transportation Systems Center, Cambridge, Mass., December 1991, describes a safety detection system for runways, focused mostly on minimizing runway incursions.

U.S. Pat. No. 5,216,611 to McElreath describes an integrated enroute and approach guidance system for aircraft. The guidance system uses data from long range aids such as the global positioning system (GPS) and an inertial navigation system (INS) and short range aids such as a microwave landing system (MLS), to modify and automatically transition an aircraft from the long range aids to the short range aids.

U.S. Pat. No. 5,574,648 to Pilley describes an airport control/management system for controlling and managing the surface and airborne movement of vehicular and aircraft within a defined and selected airport space envelope. The system establishes a three-dimensional digital map of the airport space envelope, with the map containing GNSS positioning system reference points. A computer superimposes a three-dimensional image corresponding to a path of the aircraft onto the three-dimensional map, and generates airport control and management signals as a function of the aircraft path, the computer programming, and the path to a desired apparent line of observation, in order to control the traffic in the airport.

U.S. Pat. No. 5,623,413 to Matheson et al. describes a scheduling system for moving freight trains through a multipath system that assists in the automatic control of the movement of trains through the system. The system includes a planner that is responsible for overall system planning in allocating the various resources of the system to meet the orders or demands on the system in an optimal manner. The system develops a coarse schedule for the use of the various resources and passes this schedule to a planner/dispatcher. The planner/dispatcher receives the coarse schedule from the planner and determines a detailed scheduler of the resources termed movement plan. The movement plant is then transmitted to the train controller on board the locomotive in the trains being controlled. A safety insurer may check the movement plan, and the planner may generate appropriate command signals for the various track elements to configure the railway system as needed to carry out the movement plan.

U.S. Pat. No. 4,979,137 to Gerstenfeld et al. describes an air traffic control training system. The system interacts with a user by generating a representation of at least one moving aircraft having an initial moving position and heading, for producing a dynamic simulation of an air traffic scenario. Controller commands issued by a user are entered for altering the air traffic scenario. Rules and procedures stored in a database are compared to the present state of the simulation of the air traffic scenario or to the controller command by an expert system for issuing a warning upon the immediate or foreseeable failure to observe any rule or procedure in the database.

However, none of the foregoing or other traffic control and training systems considers the control and management of a broad, system-wide context, and provides a discernible sharing of data between different domains of control.

SUMMARY OF THE INVENTION

The present invention provides a data management system and method for the management of real-time data generated at different rates, by multiple heterogeneous incompatible data sources, towards the completion of an overall end product or service.

The present invention further provides a traffic data management system (TMS) and method for the scheduling of the movement of plural vehicles such as aircraft, marine vessels, trucking dispatch, etc. The TMS and method may be used for the management of containers or cars in harbors, shipping yards and railroad switching yards. The TMS and method may also be used for managing stocks on a factory floor or a warehouse.

Additionally, the TMS and method may be used as a training tool for improving the situational awareness of the participants in airfield surface operations, such as FM tower controllers, ramp and airport operators, and commercial airlines. Better informed air traffic, airline and airport operations users will be able to make more optimal decisions to improve overall airport throughput and safety, to reduce the time losses caused by inefficient taxi and runway queuing, and to establish and update reference data values for every aircraft surface operation.

Empirical data indicates that the TMS reduces departure taxi times by roughly one minute per aircraft in operational use at Atlanta airport. At $40/minute direct costs, the TMS would provide about $12 million dollars to $15 million dollars overall annual cost savings to the airlines at that airport. Some of the contributing advantages to this time savings are:

1. The TMS allows the FM tower management to optimize the airport departure configuration ("departure split") for actual departure demand, rather than relying on published schedules.

2. Improved management of gates, servicing equipment, ground crews, etc. due to knowledge of arriving aircraft locations and time-to-gate estimates.

3. Enhanced safety through improved airfield-wide situational awareness.

4. High-speed data connections between all airport operations users improves overall airport coordination.

5. Automatic archiving of past days operation's via an information system database.

6. Electronic displays of flight data replaces paper, grease pencils, etc.

According to an exemplary embodiment, the TMS includes an automated data exchange and fusion system that assists in the optimization of airport surface traffic management, and electronically connects the air traffic control, airline, and airport operations user communities, in order to facilitate information sharing and improve taxi queuing. The TMS uses a computerized expert system to fuse data from a variety of airline, airport operations, ramp control, and air traffic control tower sources, in order to establish and update reference data values for every aircraft surface operation.

In a preferred design, the TMS is a client-server system that trades real-time aircraft operations data between the FAA, various airlines, the city Department of Aviation (airport management), and the ramp controllers. In addition to improving the level of coordination between these groups, TMS generates its own value-added data products for their use, such as estimated at-gate aircraft arrival times and estimated aircraft departure times. For departing aircraft, FAA practice is usually to assign these aircraft to a departure runway based on the Standard Instrument Departure fix given in the flight plan. Overall airport departure configuration is defined as a "split" which divides the departure fixes among the departure runways. Each departing aircraft files a flight plan which references its assigned departure fix. Changing the current split therefore changes which departing aircraft are assigned to taxi to given runways. Balancing the departure runway queues (in terms of equal wait times for the last aircraft in each queue) can be shown to generally minimize the departure bank's average taxi time. Reference is made to "Cost-Benefit Analysis to add the SMA to the Tower Control Complex (TCCC) as a Planned Product Improvement," Tower Systems Engineering Group, AUA-400/500, Federal Aviation Administration, Washington, D.C., December 1995. The TMS provides constantly updated queue-comparisons to FAA tower controllers according to all defined splits. This data allows controllers to change the split in real-time in order to keep the departure queues balanced, thereby reducing the departure taxi times overall.

The TMS further includes a plurality of interfaces that acquire data, a relational database on a central server, and a high-speed airport-area network using TCP/IP, Ethernet and point-to-point protocols. Software subsystems are linked through the central database, and include data acquisition, database server, data fusion, prediction and monitoring, system execution and error reporting, and user interface functions. The TMS is data-driven: database table accesses or value changes trigger messages or data updates to various subsystems. The database size is modest (less than 3 GB) and contains an average of 15 days of airfield operations data. The previous days' data is averaged to provide default values when data is missing or deemed to be unreliable by the data fusion rules in the prediction subsystem. A software executive subsystem starts processes, monitors their health, recovers from faults or unexpected process terminations, and notifies the maintenance staff if an unrecoverable fault occurs.

The TMS uses rules designed to accommodate a changing airport model and less than ideal information flow. The TMS incorporates heuristic assumptions for arrivals and departures to address less than ideal conditions or problems, including triggers and mitigation actions. In addition, the TMS saves synthesized data in an archive for future use and analysis. Some of the saved synthesized data includes:

1. Flight history of items such as last radar position, arrival times, departure times, gate, and aircraft type.

2. Runway statistics (hourly, year to date, daily and monthly) of items such as airline and aircraft type.

3. Actual and planned departures times (quantitative time differences between information sources such as Flight Information Display System (FIDS) vs. pushback vs. wheels-up).

BRIEF DESCRIPTION OF THE DRAWINGS

The above and other features of the present invention and the manner of attaining them, will become apparent, and the invention itself will be best understood, by reference to the following description and the accompanying drawings, with similar numerals referring to similar elements in the drawings, wherein.

DETAILED DESCRIPTION OF THE INVENTION

Overall Functional Architecture

Figure 1:
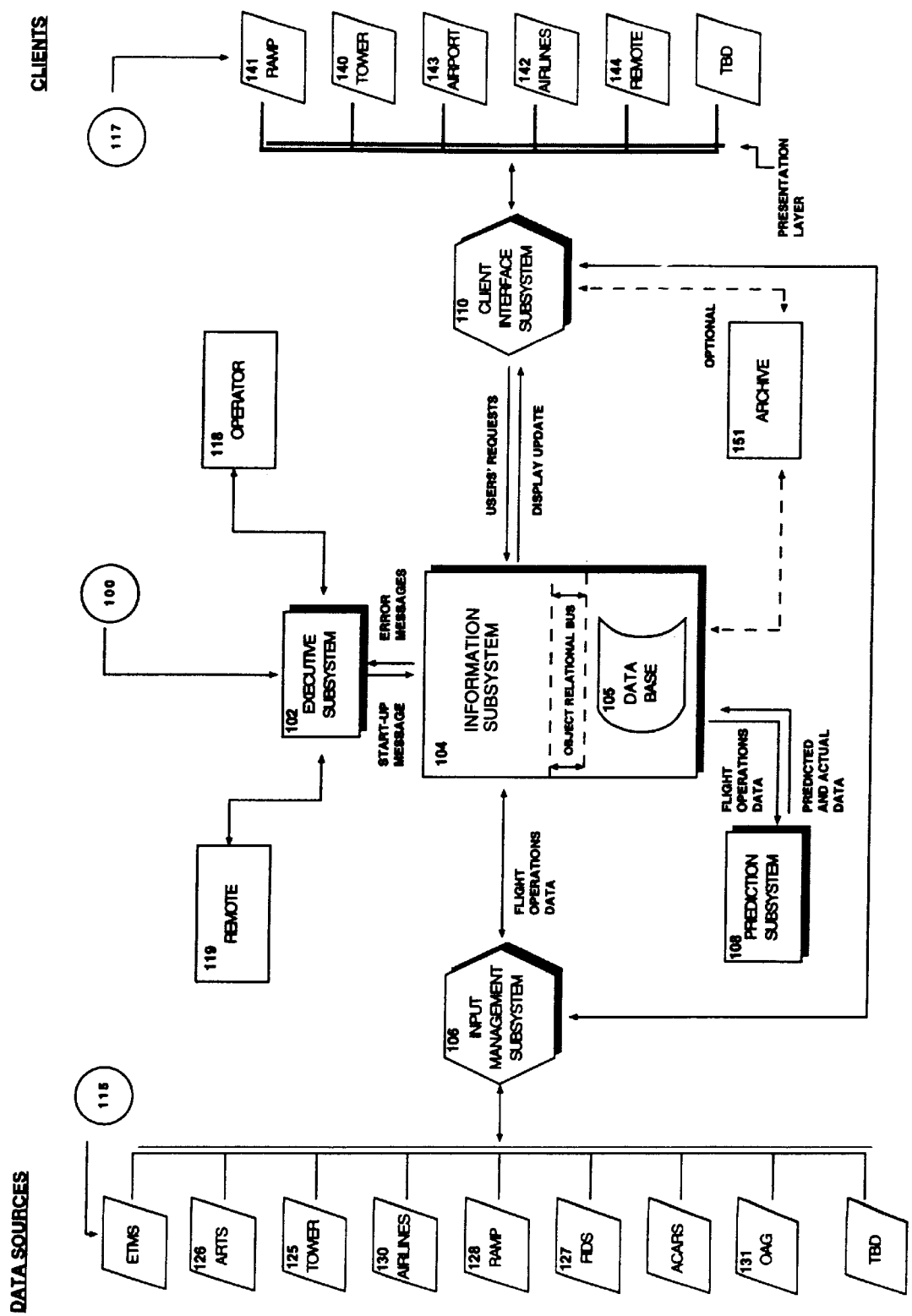
FIG. 1 is a functional flow chart illustrating the overall architecture of a traffic management system of the present invention.
Figure 2A:
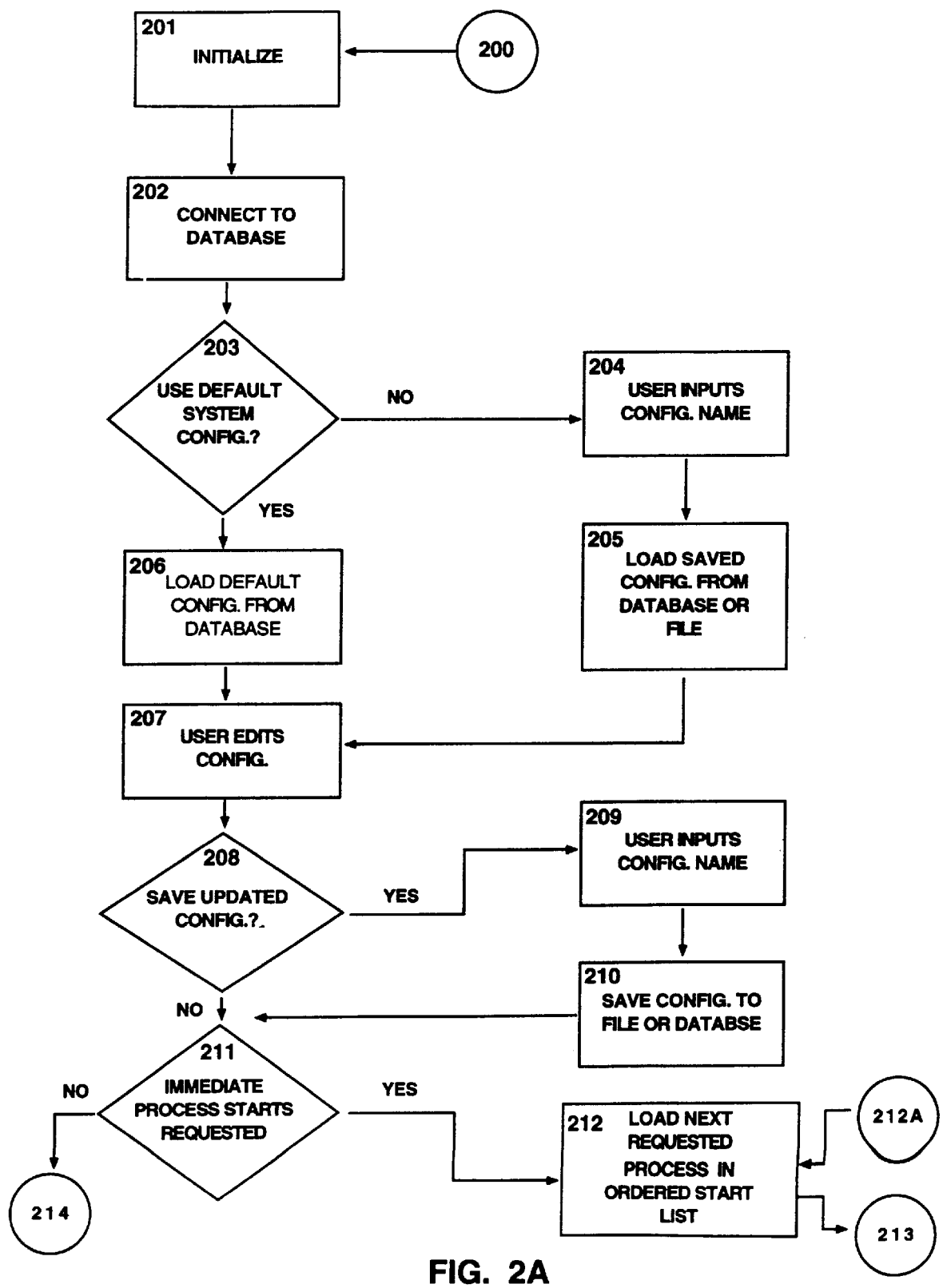
FIG. 2 comprises FIGS. 2A, 2B, 2C, and 2D, and represents a functional flow chart of an executive subsystem forming part of the traffic management system of FIG. 1.
Figure 2B:
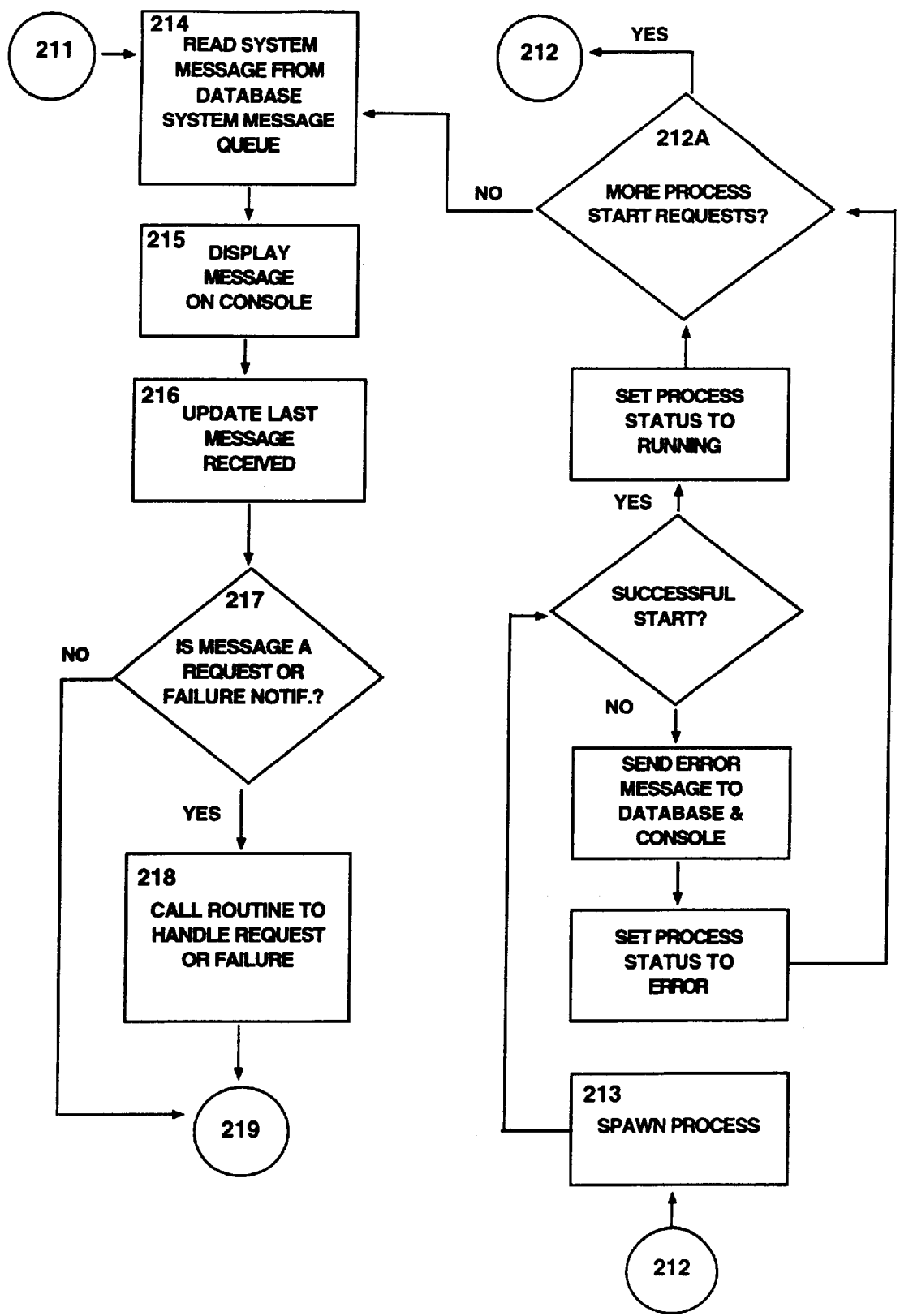
Figure 2C:
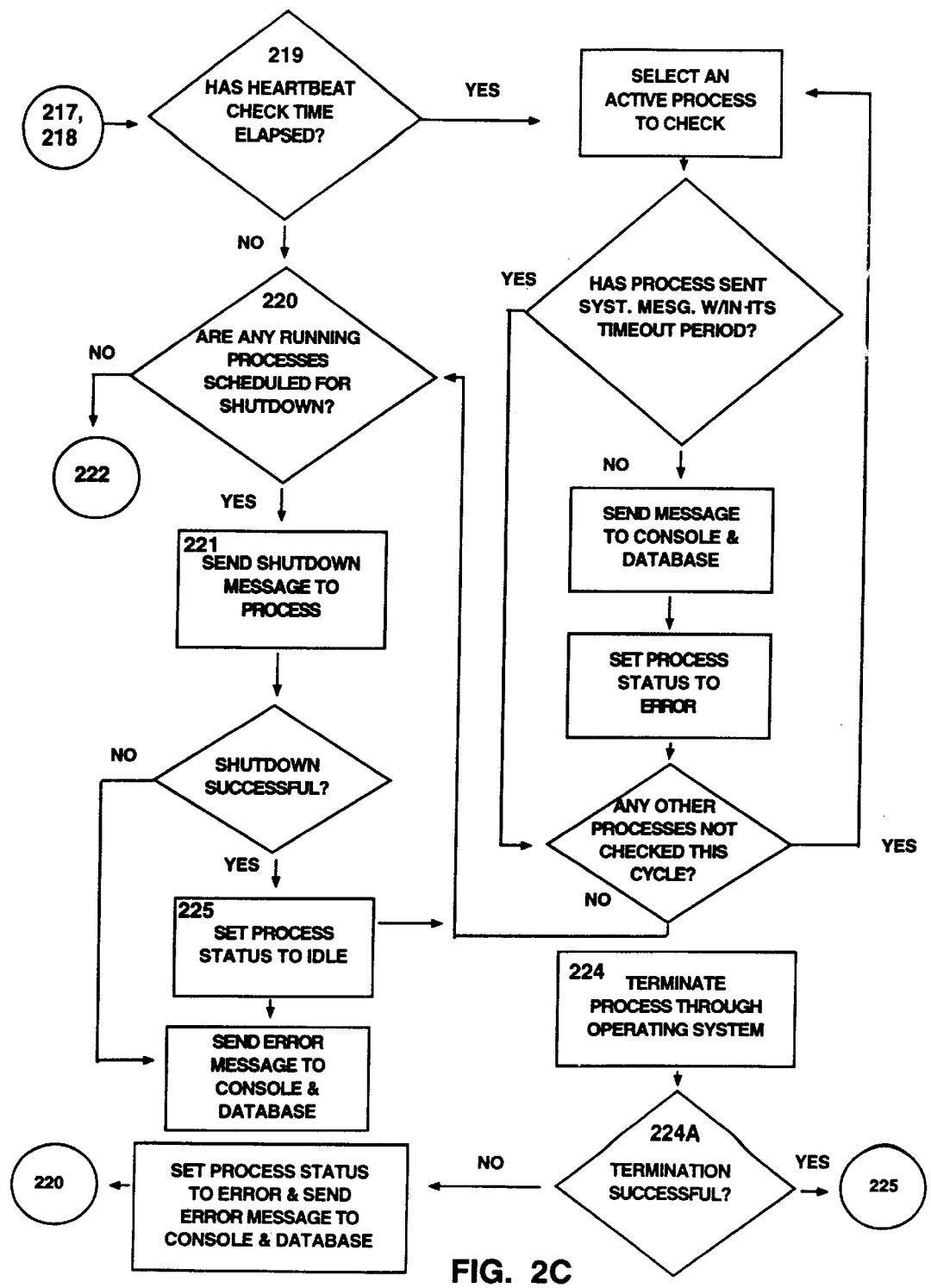
Figure 2D:
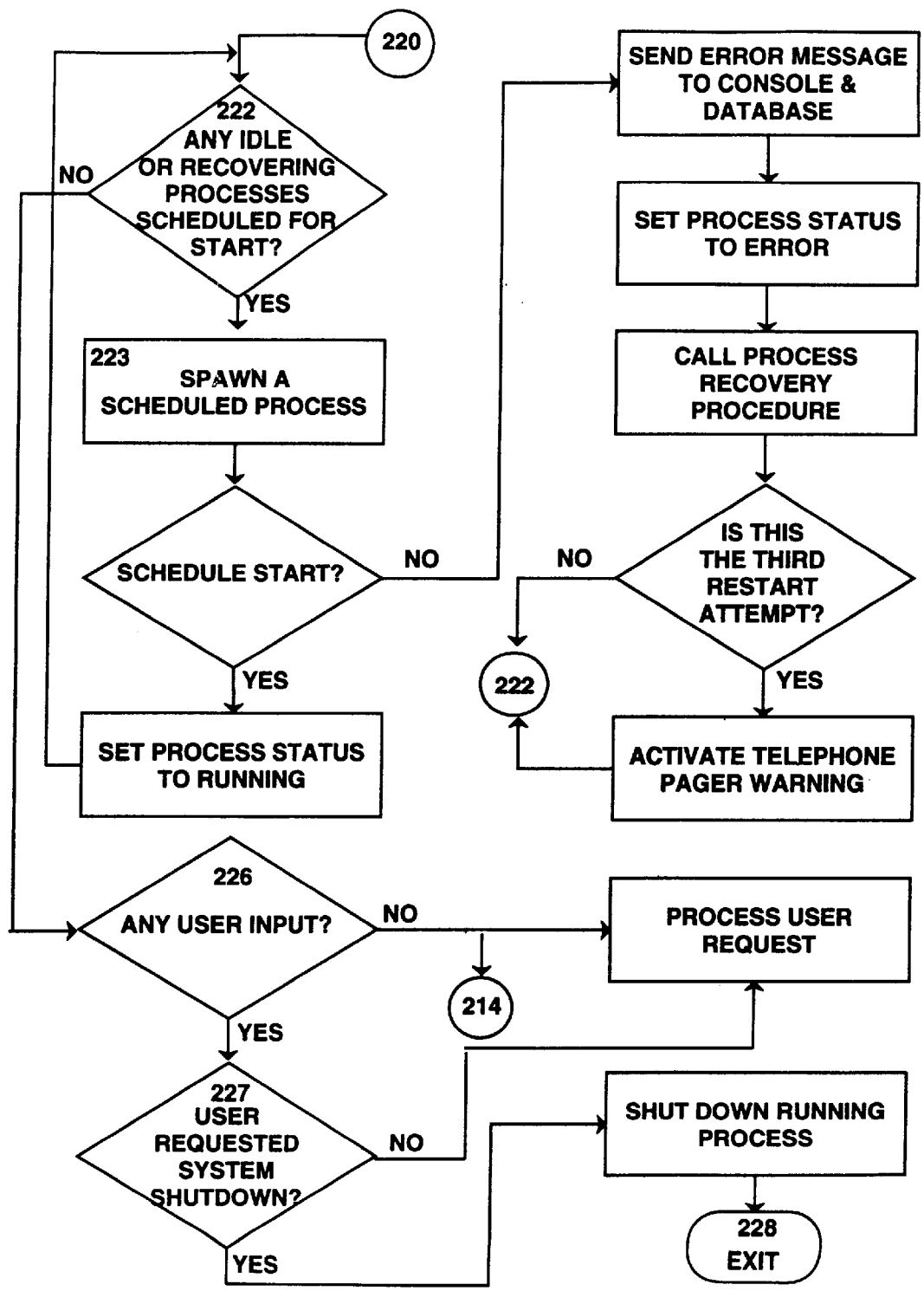

The overall architecture of a preferred traffic management system (TMS) 100 of the present invention will be described in relation to FIG. 1. The TMS 100 generally includes an executive subsystem 102, an information subsystem 104, an input management subsystem 106, a prediction subsystem 108, and a client interface subsystem 110, that are interconnected to interchange real-time aircraft operations data between the FAA, various airlines, the city Department of Aviation (airport management), and the ramp controllers. In addition to improving the level of coordination between these groups, the TMS 100 generates its own value-added data products for the use of these groups, such as estimated at-gate aircraft arrival times and estimated aircraft departure times.

Figure 3:
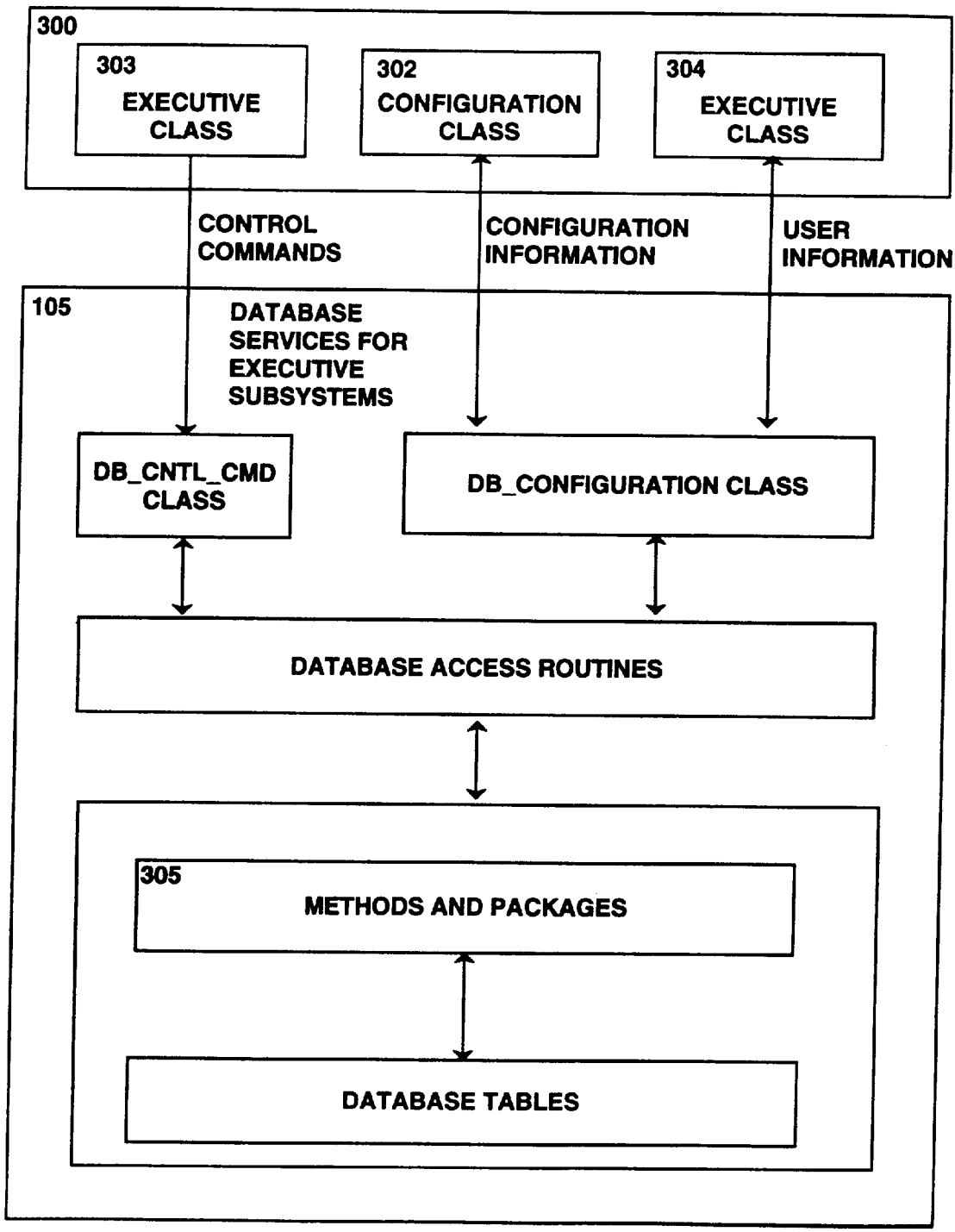
FIG. 3 is a high level block diagram of the executive subsystem of FIG. 2.

The executive subsystem 102 is responsible for controlling the other subsystems, starting and shutting down processes at scheduled times, monitoring system components for error and warning conditions, notifying system support personnel of detected system errors, and, when possible, recovering from system failures. Additional duties of the executive subsystem 102 include facilitating subsystem debugging, providing remote access to the TMS monitoring and control, maintaining system statistics, and managing user accounts. Other programs included in the executive subsystem 102 enable it to issue commands to reset various hardware components of the TMS 100. The executive subsystem 102 and its operation are illustrated in FIGS. 2 and 3.

The information subsystem 104 integrates the remaining subsystems 102, 106, 108, 110 and offers services in four categories:

1. The information subsystem 104 communicates traffic raw data Inputs from automatic data streams and manual inputs to the prediction subsystem.

2. It provides inter-process management and control.

3. It supports information processing.

4. It provides system housekeeping.

Figure 4:
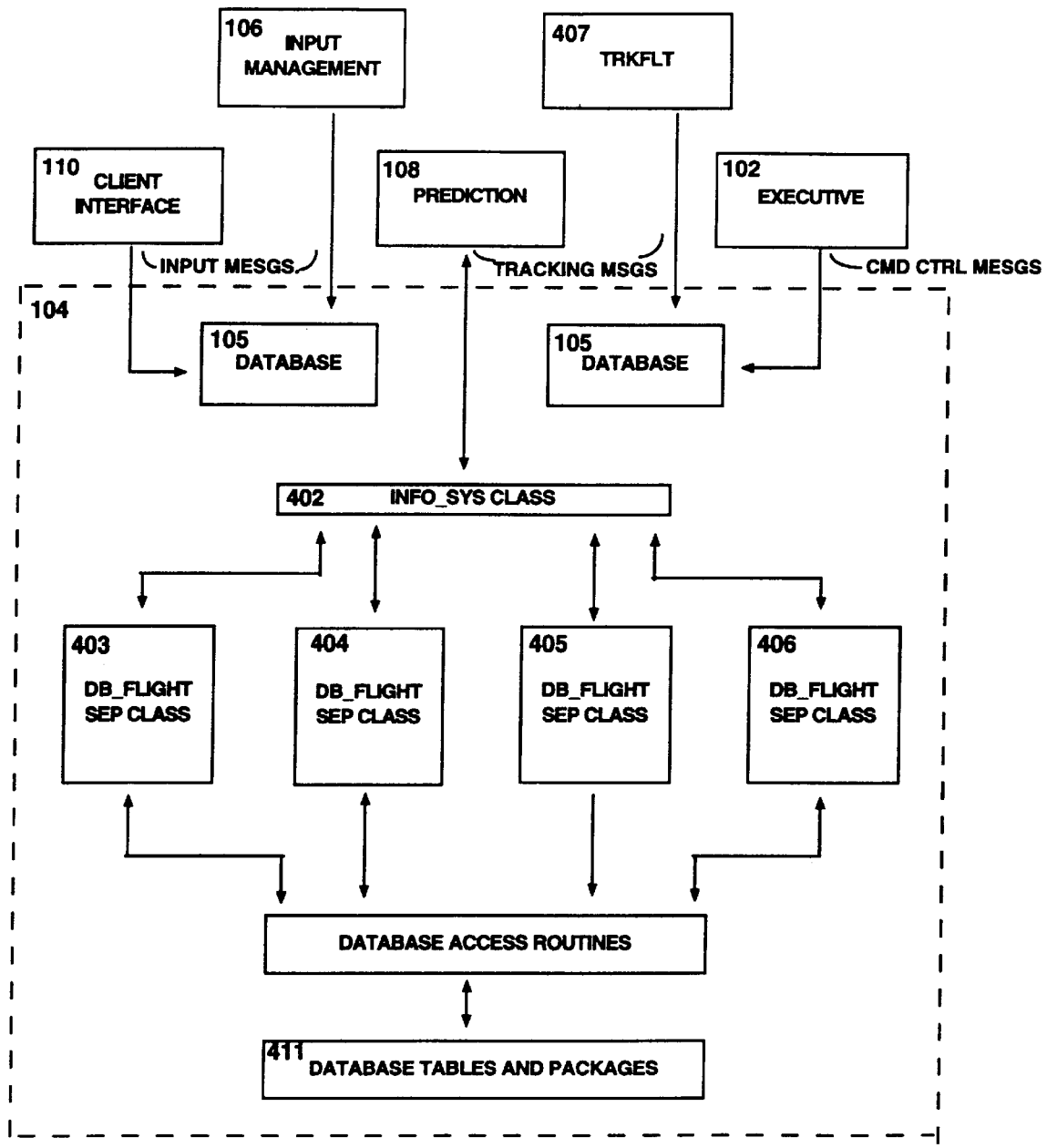
FIG. 4 is a high level block diagram of an information subsystem forming part of the traffic management system of FIG. 1.

The information subsystem 104 is illustrated in FIG. 4.

Figure 5:
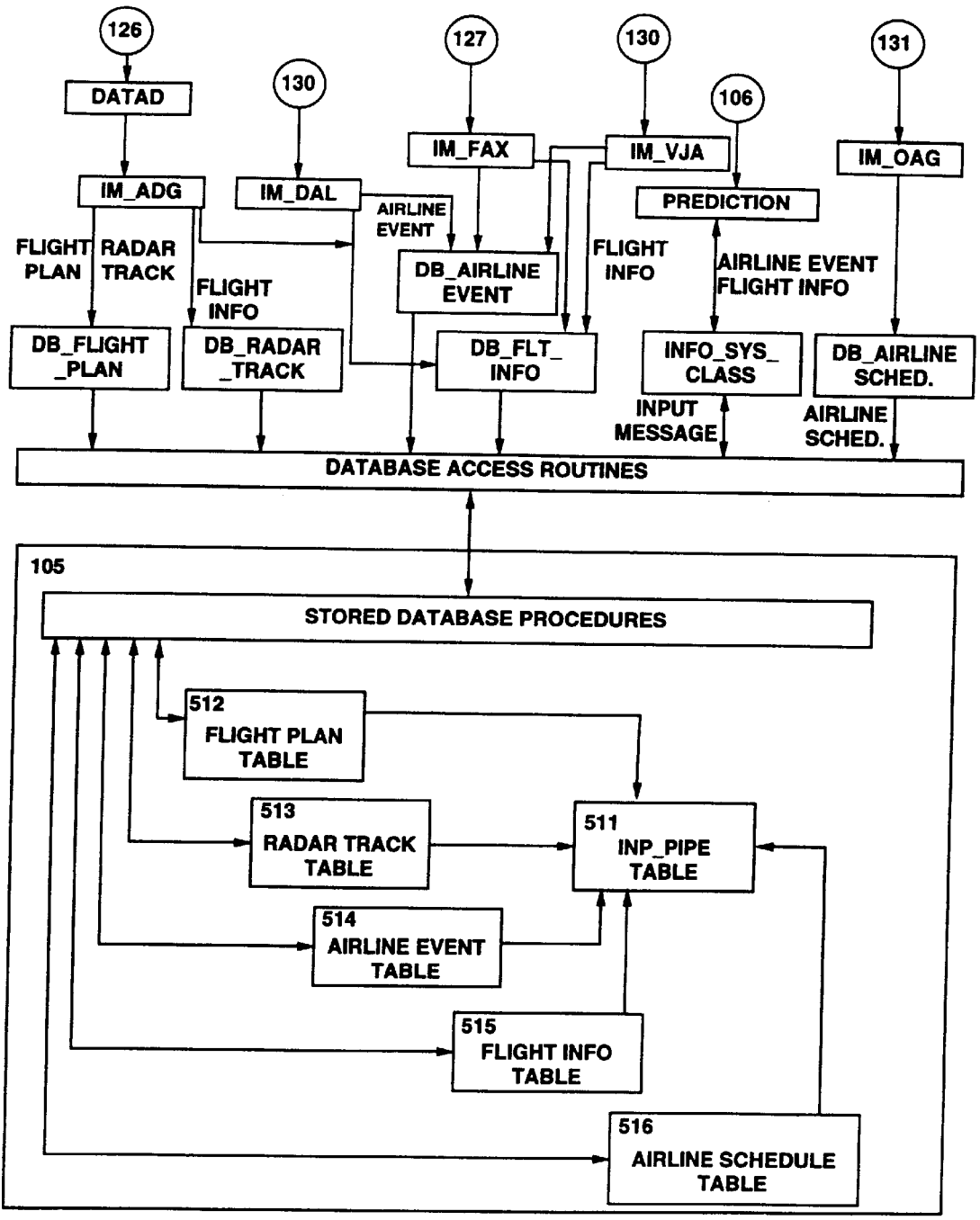
FIG. 5 is a high level block diagram of an input management subsystem forming part of the traffic management system of FIG. 1.

The input management subsystem 106 is a collection of software programs dealing with various external input data sources 115 that are connected to the TMS 100. The input sources 115 provide data, in "real-time" over network or serial links, such as FTP file transfer, to the input management subsystem 106. In turn, the input management subsystem 106 feeds the data to the information subsystem 104. The input management subsystem 106 is illustrated in FIG. 5.

Figure 6:
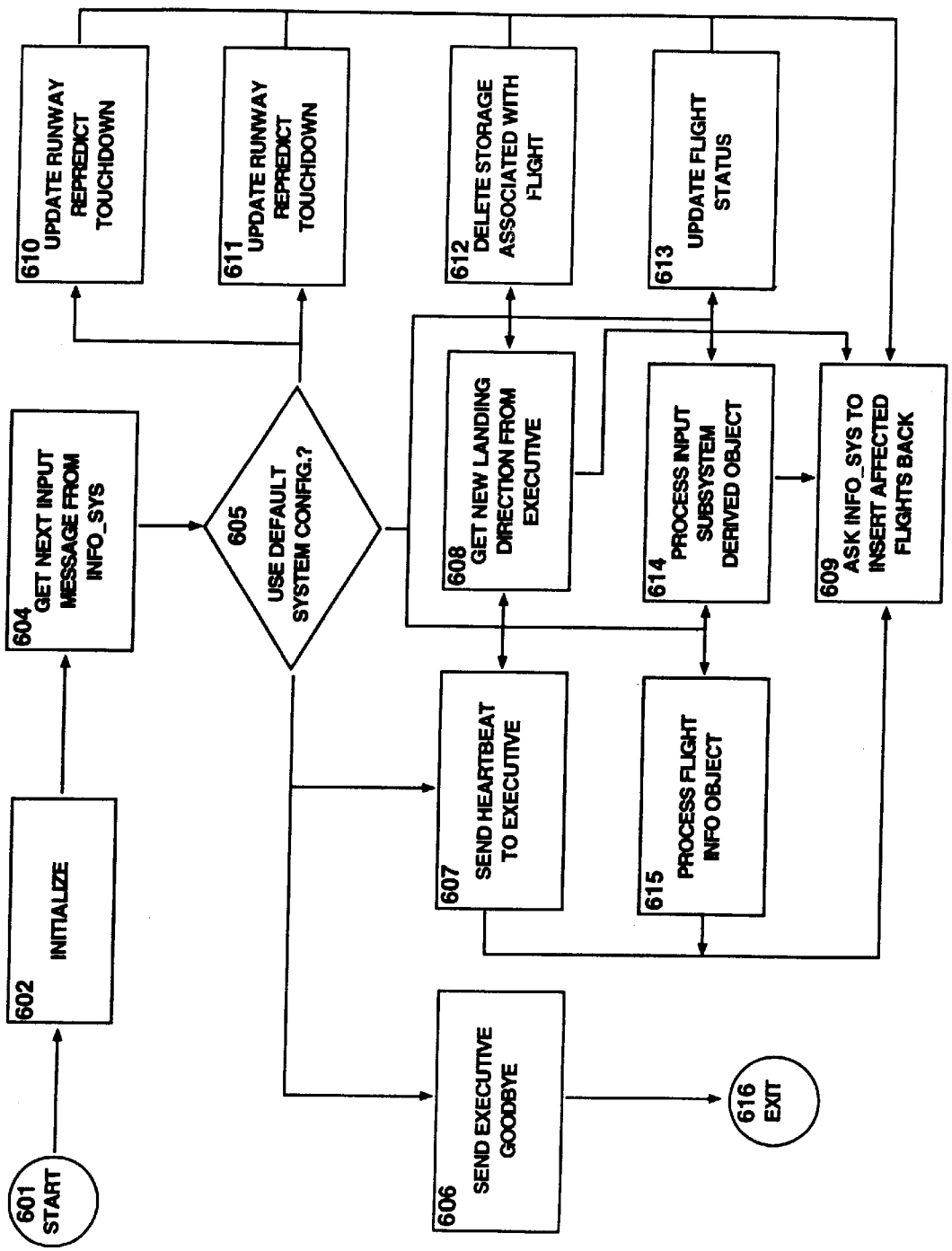
FIG. 6 is a high level block diagram of a prediction subsystem 108 forming part of the traffic management system of FIG. 1.

The prediction subsystem 108 is responsible for integrating all the input sources 115 connected to the TMS 100, in order to monitor the progress of arriving and departing flights, and to predict when key events will occur, including pushback, take off, touchdown, or gate arrival. The integrated monitoring information and predicted values are fed back to the information subsystem 104, for display by the client interface subsystem 110. The prediction subsystem 106 is illustrated in FIG. 6.

The client interface subsystem 110 is a collection of software programs that provide a graphical user interface to the TMS 100. In a preferred embodiment, the client interface subsystem 110 performs the following functions:

1. It distributes flight data from the information subsystem 104 to various external destinations sources or clients 117, via socket connections.

2. It provides a graphical user interface for continuously displaying flight data on a bit-mapped display, and for executing various commands to change the flight data or the method of its display.

3. It starts a client interface subsystem, and provides a limited number of automatic restarts if the client interface subsystem fails.

4. It provides TMS status and schedules data to the external destinations 117 over a network socket or a UNIX-domain socket.

5. It provides TMS status and schedules data to the external destinations 117 via a serial line. The data is provided as messages written to standard output so it can be read either over a serial line or on a screen.

Figure 7:
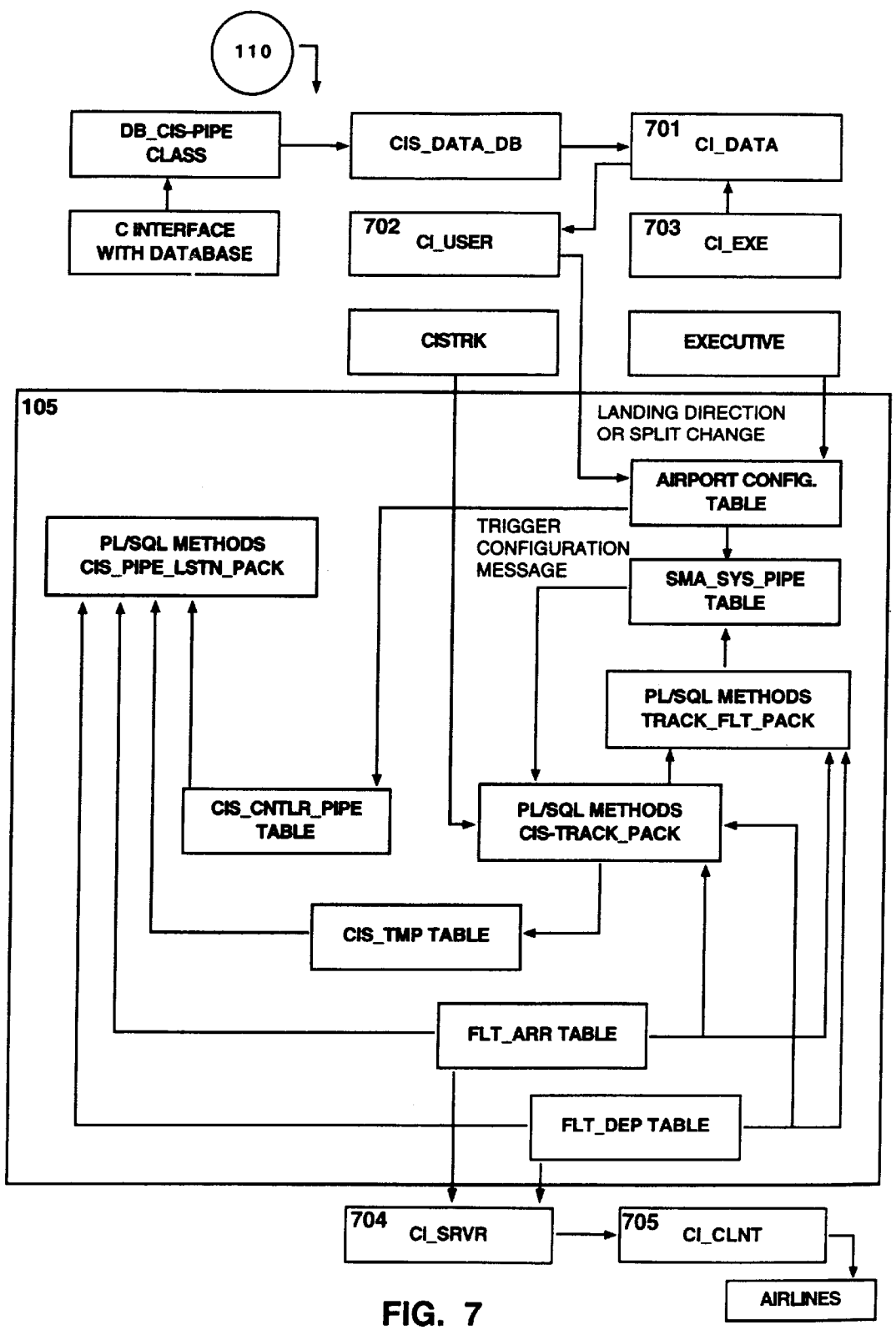
FIG. 7 is a high level block diagram of a client interface subsystem forming part of the traffic management system of FIG. 1.

The client interface subsystem 110 is illustrated in FIG. 7.

Overall Hardware Architecture

The TMS 100 system hardware includes a server and multiple workstations. Most of the software runs on the server. Various network and communication devices are used as part of the operational TMS 100, including network routers and hubs and the associated cabling, a terminal emulator, and several modems. The server and all the workstations are connected via Ethernet in a Local Area Network (LAN). Display hardware includes X-Window system display servers, either as stand-alone X-Window servers or workstations or PC-based X-Window servers. Stand-alone flat-panel LCD touch-screens are used in the FAA Tower Cab to provide TMS display information for the FAA Tower controllers and supervisors 140. The screens allow FAA Controllers 140 to enter a limited amount of data into the TMS 100 and to control the content of the displays. PC-based displays are used in the Ramp Towers 140 by airline controllers and airport operators.

The hardware for the server and the workstations is standard commercial computer equipment, available, for instance from Silicon Graphics, Mountain View, Calif. All the TMS software programs except one (datad) are executed by the TMS server. The datad program is part of the input management subsystem 106, and is executed at least in part by workstations. It should be clear that datad can also be executed on the server.

The TMS 100 may optionally include an archive file 151 to which data from a database 105 is periodically transferred for storage. The archive file may be selectively accessed by the various subsystems of the TMS 100 and/or the clients 117.

The Executive Subsystem 102 (FIGS. 2, 3)

The primary responsibilities of the executive subsystem 102 are to control the various TMS subsystems 102, 104, 106, 108, 110; to start and shut down the TMS processes at scheduled times; to monitor system components for error and warning conditions; to notify the TMS system support personnel of detected system errors; and, when possible, to recover from system failures. Additional duties of the executive subsystem 102 include facilitating subsystem debugging, providing remote access to the TMS monitoring and control, maintaining system statistics, and managing user accounts.

Typical use of the executive subsystem 102 entails starting the executive subsystem process 200 (FIG. 2); updating the TMS system configuration; then commanding the executive subsystem 102 to start selected sections or routines of the TMS subsystems 104, 106, 108, 110. The executive subsystem 102 starts the processes 104, 106, 108, 110, and monitors the subsystems health. When scheduled process idle times or start times arrive, the executive subsystem 102 automatically shuts down or starts selected routines of the TMS subsystems 102, 104, 106, 108, 110, as appropriate. The executive subsystem processes 200 is intended to run continuously.

The executive subsystem 102 maintains a TMS system configuration that includes the TMS system operation mode, airport configuration parameters, active and inactive TMS subsystems, subsystem debugging information, and user authorizations. The active TMS configuration is stored in the database 105 for access by all TMS processes (to be described later). The TMS system administrator may also save named configurations in the database 105 or in a file for later recall at system startup. The active configuration is stored in the database 105 under the name "current". A configuration is loaded into the executive subsystem 102 each time it is run. The configuration stored in the database 105 under the name "default" is loaded as the default configuration.

The executive subsystem configuration maintains a record for each subsystem process in the TMS 100. This includes an indication of whether each process is active, idle, excluded, or in an error condition. Active processes are those currently running. Excluded processes are those that will not be run in the current configuration even if they have a scheduled start time. Idle processes are not currently running, but will start at their scheduled start times. Error conditions occur when the executive subsystem 102 detects a problem with a process.

Once the configuration of the executive subsystem 102 is set up, the operation of the TMS 100 is mostly automatic. The executive subsystem 102 can be commanded to start all desired TMS processes automatically, or a system operator 118 (FIG. 1) can start each TMS process individually. Once a process starts, the executive subsystem 102 will monitor this process to ensure it continues to run properly. Processes can be scheduled to automatically start and shut down at specific times. The executive subsystem 102 also gathers statistics on TMS uptime and availability.

The executive subsystem 102 can be started in a reattach or remote modes. In the reattach mode the executive subsystem 102 reestablishes control and monitoring over currently running TMS processes. The reattach mode is used in the event that the executive subsystem 102 needs to be restarted.

The remote executive mode is used when a primary TMS executive subsystem 102 is already running, but a remote user 119 (FIG. 1) from another location wishes to monitor or control the TMS 100. The remote executive mode establishes an interprocess link with the primary executive subsystem 102 and allows the remote user 119 to view the same information available on the primary executive subsystem 102 and to send commands to be executed by the primary executive subsystem 102.

With reference to FIG. 2, the executive subsystem 102 startup begins at step 201 with a configuration editing menu by connecting the executive subsystem 102 to the database 105 (step 202), and inquiring whether or not to use the default system configuration (step 203). This allows the operator 118 to input the desired configuration name (step 204), to load a saved TMS configuration from a file or the database 105 (step 205). Alternatively, the executive subsystem 102 loads the default configuration from the database 105 (step 206). The operator 118 can then edit individual configuration parameters (step 207), and the executive subsystem 102 inquire whether or not to save the updated configuration (step 208). The operator 118 can then input the configuration name (step 209), delete the saved configurations, and edit the user account information. The executive subsystem 102 then saves the updated configuration in a file or the database 105 (step 210).

The executive subsystem 102 then inquires whether or not to start the TMS 100 (step 211). If a start process command were issued, the executive subsystem 102 will automatically start the designated processes in a predefined order. For most process start commands, the executive subsystem 102 will spawn the process (step 213) and move on to the next task (step 212), gathering messages from newly started processes as they arrive. For some processes the executive subsystem 102 has a built-in delay after the process starts to allow time for initial or complete processing to occur. This is used for processes that might have trouble if they were interrupted during that initial execution period. For instance, the database backup process is run when no other processes, including the executive subsystem 102, are updating the database tables.

Starting the executive subsystem 102 in reattach or remote mode will bypass the configuration editing menu, immediately placing it in the control and monitoring loop. While in the control and monitoring loop the executive subsystem 102 will receive system messages transmitted through the database by TMS 100 processes. These messages have a designated criticality.

The executive subsystem 102 periodically checks for new incoming system messages (step 214), for instance once per second. Every 30 seconds the executive subsystem 102 checks on the health of the TMS 100 processes and performs any process starts or shutdowns scheduled for that time period.

While in the control and monitoring loop the executive subsystem 102 will display a scrolling list of incoming system messages (step 215), and will accept control commands from the TMS operator 118 and consequently update the last message received, and the time the last system message was received from that process (step 216).

The executive subsystem 102 determines whether each received message is a request or a failure notification (step 217). If it is, then a routine designated to handle this request or failure is called (step 218).

A 'request heartbeat' command sends a request for a heartbeat message to a specified process (step 219). If the process is healthy and accepting the executive subsystem 102 commands, it will respond with a HEARTBEAT system message.

A 'enter split' command is used to enter a new airport split. The command displays the current split, prompts for the name of the new split, and updates the TMS configuration with the new split. Split names may be specified as departure gate names (abbreviated N1, N2, E1, E2, S1, S2, W1, W2 or N for both North gates, etc.) with a '/' separating the gates assigned to the North runway complex and those assigned to the South complex. For instance, ES1/NWS2 would associate the East 1, East 2, and South 1 departure gates with the North runway complex, and the North 1, North 2, West 1, West 2, and South 2 gates with the South runway complex.

A 'update landing direction' command is used to enter a new airport landing direction. The current landing direction is displayed and the operator is prompted to enter a new landing direction (i.e., EAST or WEST).

A 'process start or shutdown' command allows the operator to start processes or shut down active processes (step 220). A list of processes with their current status is displayed. The operator 118 can choose to shut down the entire TMS 100 system (step 221) or select a process to start or shut down (step 222). If a process start is requested, the executive subsystem 102 will spawn that process (step 223).

If a process shutdown were requested, the executive subsystem 102 asks if automatic scheduled startups should be allowed, or if an immediate restart is desired. The executive subsystem 102 then sends a shut down command to the process (step 221). If the process doesn't respond to the shut down command, the executive subsystem 102 will terminate the process (step 224). This is repeated a number of times if the process does not exit immediately. If automatic scheduled starts are desired, the process status is set to IDLE (step 225) so the starts will occur. If scheduled starts are not requested, the process status is set to EXCLUDED. If an immediate restart is requested, the process is started after the shutdown sequence is complete.

When a process start or shutdown command, or a system shutdown command is issued, the executive subsystem 102 asks the operator 118 to confirm the command in case the incorrect process was selected Also, a system shutdown command issued from the remote user 119 will cause the primary executive to shut down all of the other TMS processes, but the primary executive subsystem 102 will not shut down.

A 'quit' command shuts down the executive subsystem 102 process (step 227) without shutting down the rest of the TMS processes. This is a preferred exit for the remote user 119. The command can also be used to exit (step 228) the primary executive subsystem 102 to restart it in the reattach mode so it can read updated parameter files without shutting down all of TMS 100.

In addition to the above process 200, the executive subsystem 102 performs various housekeeping tasks for the TMS 100. Early each morning when the airport traffic load is light, the executive subsystem 102 shuts down the TMS 100 and runs housekeeping processes. These processes include a backup and cleanup of the TMS database 105, a database time synchronization process, and a process to reset the ARTS Data Gatherer (ADG) 126. After the housekeeping processes are complete, the TMS 100 processes are restarted and the TMS 100 returns to normal operations.

Periodically, i.e., every 30 seconds, the executive subsystem 102 performs a system health check. This involves checking on the TMS process activity and status. The primary health monitoring mechanism is the heartbeat message.

Most of the TMS processes are set up to send heartbeat system messages at regular intervals. The default heartbeat interval is set to one minute, but some processes send heartbeats more or less frequently depending on how long the process needs to spend in input routines, etc., and how quickly the process must recover from failures. Standard heartbeat routines were provided for the processes to use. The executive subsystem 102 keeps track of when each system message is received from each process. There are parameter files that specify time-out periods for each process. These time-outs can vary for different times of day if more or less activity is expected for different periods. If the executive subsystem 102 does not receive a system message from an active process within its designated time-out period, it begins a failure recovery routine.

For those processes that do not send heartbeat messages, the executive subsystem 102 checks process health to determine if the process identification (PID) number is still active. Some processes will send a message containing their PID to the executive subsystem 102 on startup. For other processes the executive subsystem 102 uses the PID of the spawned process X-window and assumes that the process has not exited as long as the window is still active. If a process PID health check fails, recovery procedures begin.

The executive subsystem 102 can also monitor the number of records processed by a subsystem by checking the records processed field contained in each heartbeat message. This is intended to detect when a process has lost contact with an input source. A parameter file contains the number of records expected to be processed by a given subsystem during a heartbeat interval. Since some processes receive a variable amount of input during the course of a day, it is possible, to set different expected record counts for different time intervals. If a subsystem has a low record count for several consecutive heartbeat messages, the executive subsystem 102 initiates failure recovery for that process.

When the executive subsystem 102 detects a process heartbeat time-out or an inactive process identification number, it begins an automated process failure recovery procedure.

If the executive subsystem 102 is unable to automatically recover from a process failure, or if it detects a problem in the executive subsystem 102 process itself, it has the capability to notify the TMS support or maintenance personnel. This is accomplished through electronic mail messages and through an automated paging program. If an unrecoverable failure occurs, the executive subsystem 102 composes an electronic mail message that indicates which process has failed, when the failure occurred, and what the significant failure symptoms are. This mail message is automatically sent to the TMS support or maintenance personnel.

With reference to FIG. 3, the executive subsystem process 200 is composed of several classes, some of which are shared with other TMS 100 subsystems via links 122, 123 (FIG. 1). The SMA_process class 300 is a base class for the main process class in each TMS process. It provides an interface between the processes and the TMS 100 configuration information stored in the information subsystem 104. It retrieves and stores the debug information for each debuggable class contained in the process. The debug information is stored in Config_info class 302. This class also provides the interface to send system messages to the executive subsystem 102 and receive control commands, such as "shut down" or "send heartbeat", from the executive subsystem 102.

An Exec_proc class 303 is the main process class for the executive subsystem process 200. Exec_proc class 303 provides methods to access and update the TMS 100 configuration in the information subsystem 104, read and process system messages, monitor process status, start and stop TMS processes, recover from process failures, and create and destroy remote executive subsystem 102 connections.

The Exec_proc class 303 run method is called with a parameter to indicate the desired executive subsystem 102 run mode (normal, reattach, or remote). In the normal mode it will bring up a configuration editing menu. This allows the operator to update the configuration and run the TMS 100 system. In the reattach mode, it reads the current system configuration from the information subsystem 104. In the remote mode, it reads the current configuration from the information subsystem 104 and sends a system message to the primary executive subsystem 102 to establish a communication link. In each case, the executive subsystem 102 will call a monitor_TMS routine after the configuration is loaded in memory. This monitor_TMS routine reads and processes incoming system messages. In the primary executive subsystem 102 this routine also monitors process health, recovers from process failures, and starts and stops processes at scheduled times.

A User_info class 304 contains information about an TMS 100 user: name, login status, user group, FIDS system, and airlines served. A user_info object is instantiated for each user and stored in the Configuration class 302.

Information Subsystem 104 (FIG. 4)

The information subsystem 104 receives data from the various subsystems 102, 106, 108 and 110 of the TMS 100, processes the data and stores it in the database 105, and then feeds back or makes available the data stored in the database 105 to the executive subsystem 102, the prediction subsystem 108, and the client interface subsystem 110 using embedded SQL statements. For the purpose of simplicity of description, the database 105 is considered as part of the information subsystem 104. It should however be understood that the database 105 may be separate from the information subsystem 104.

With reference to FIG. 4, the information subsystem 104 includes an Info_sys object class 402 having four associated classes: Db_flight dep Class 403, Db_flight arr Class 404, Db_common Class 405, and Db_is_pipe class 406; and a trkfit process 407. The database 105 makes up an access and transmittal layer for the communication of messages between the various TMS subsystems. The TMS 100 processes that communicate with the prediction subsystem 108, are the client interface sub-system (CIS) 110, the input management sub-system 106, Trkflt process 407, and the executive subsystem 102. Info sys class 402 is created by the prediction subsystem 108, and includes methods for connecting and disconnecting from the database 105, and for sending system and error messages to the executive subsystem 102 from the class Db_common 405.

The Db_common class 405 provides methods for connecting to the TMS database 105 and for inserting error messages into an error message table. Db_common also provides a method for getting messages from an input pipe table 511 forming part of the database 105 (FIG. 5).

The Db_flight_arr class 404 provides an object that acts as an interface to a database table 411, containing information about arrival flights. It provides capabilities for creating, updating, and querying information about an arriving flight. The Db_flight_arr class 404 includes a method for connecting and disconnecting from the database 105 from the Db_common class 405.

The Db_flight_dep class 403 provides an object that acts as an interface to the database table 411, containing information about departure flights. It provides capabilities for creating, updating, and querying information about a departing flight in the database 105. The Db_flight_dep class 403 includes a method for connecting and disconnecting from the database 105 from the Db_common class 405.

The Infop_sys Class 402 provides an interface object between the inputs and the monitoring and prediction system and between the monitoring and prediction subsystem 108 and the database 105. The Info_sys Class 402 includes a method for connecting and disconnecting from the database 105.

The CIS subsystem 110 and the input management subsystem 106 send prediction messages about flight-events to the information subsystem 104. Landing direction and split changes and removal of flights from displays by air traffic controllers 125 (FIG. 1) are recorded in the database 105. Database entries on these configuration changes also trigger the transmission of messages to the prediction subsystem 108. These messages are routed through the Info_sys class 402 to the prediction subsystem 108. Similarly, database entries for airline_schedule, flight-plans, radar-tracks, and other events are communicated to the prediction subsystem 108 in the form of input messages. An independent process "trkflt" 407 monitors arriving and departing flights and sends messages about possible changes in status to the prediction subsystem 108 The executive subsystem 102 sends command and control messages such as "SHUT-DOWN" and "HEARTBEAT" to the prediction subsystem 108, and the prediction subsystem 108 sends status messages back. The database 105 is the underlying mechanism for communicating these messages to and from the prediction subsystem 108. The Info_sys class 402 manages the interface between the prediction subsystem 108 and the database 105.

Input messages from the CIS subsystem 110 and the input management subsystem 106, tracking messages from Trkflt process 407, and system messages from the executive subsystem 102 are routed through the database 105 to Info_sys 402. The prediction subsystem 108 uses methods within Info_sys 402 to determine the type of message and to obtain the message. The message type is returned to the prediction subsystem 108 by Info_sys 402. By knowing the message type, the prediction subsystem 108 can call the appropriate version of an overloaded method Info_sys 402 formats data from the message body, copies it to the appropriate object's attribute, and returns an object of the appropriate class to the prediction subsystem 108. Info_sys 402 also routes control-command messages from the executive subsystem 102 and tracking messages between Trkflt process 407 and the prediction subsystem 108. The message type allows the prediction subsystem 108 to invoke the appropriate method that associates the message with the corresponding flight in the prediction subsystem's 108 arrays of flight objects. When notified of a split change, the prediction subsystem 108 calls Info_sys 402, which, in turn, sends a message to the prediction subsystem 108 to update the departure and arrival flight information. The message type instructs the prediction subsystem 108 of the correct method to invoke to get the index of the affected flight in the prediction subsystem's 108 arrays of flights. When the prediction subsystem 108 wants to store or request flight information from the database 105, it calls Info sys's methods for finding, creating, updating and deleting flight-information in the database 105.

A system_message, such as a count of records processed since the last request for "HEARTBEAT" by the executive subsystem 102, is inserted into a "sys_msg" table 411, forming part of the database 105, where it is read by the executive subsystem 102.

The prediction subsystem 108 calls Info_sys class 402 when it is ready to process the next message. When Info-sys class 402 is so invoked for the first time, the database 105 mechanism for retrieving messages, is initialized. Using the message type and the message key in the database 105, the message is retrieved from either a table from the executive subsystem 102 or from an input-table, and is returned to Info_sys 402 as a variable length, comma delimited string. The prediction subsystem 108 then calls an Info_sys 402 method to process the input message.

For inputs from the Trkflt process 407 the prediction subsystem 108 calls the appropriate Info_sys 402 method to get the index of the flight that is the subject of the tracking message. Messages generated by a call to get the affected flights are handled in a similar manner to messages from the Trkflt.process 407.

The prediction subsystem 108 uses information from the input messages to monitor the progress of flights and to predict push backs, take-offs, touchdowns and gate-arrivals. This flight status information is written to the database 105 for display by the CIS 110. Info_sys 402 provides the mechanisms for writing to the database 105. The organization of the database 105 tables and procedures for accessing the database 105, reflects the two types of flights: Departures and Arrivals.

The prediction subsystem 108 calls methods in the Db_flight_dep class 403 and the Db_flight_arr class 404 to store flight information in the database 105. When a row for a flight is inserted in the database 105 the flight's index into the prediction subsystem's 108 arrays of departure objects or arrival objects is also stored in the database 105.

The database 105 is the mechanism for logically connecting a message with the flight that is the subject of the message. When the prediction subsystem 108 wants to associate a message with a departing flight it calls Info_sys's (402) methods "find_flight_dep". It calls Info_sys's (402) method "find flight_arr" when it wants to associate a message with an arriving flight. These methods return the array-index of the flight if a matching flight is found in the database 105.

Periodically the prediction subsystem 108 reorganizes the arrays of departing and arriving flight objects it holds in memory. When a flight-object's position in an array changes, the prediction subsystem 108 updates the array-index column in the flight's row in the database 105 to reflect this change. The prediction subsystem 108 updates the array-index column by invoking Info_sys's (402) method "store_new_index" and by passing the flight-type and flight's key as parameters. If the flight is a departure Info_sys 402 passes this request and the flight's key to the Db_flight_dep object. 403 If the flight is an arrival, Info_sys 402 passes this request and the flight's key to the Db_flight_arr object 404.

The prediction subsystem 108 expires a departing flight after a take-off occurs and expires an arriving flight after it lands. The prediction subsystem 108 expires flights by calling Info_sys's method "expire_flight" and by passing the type of flight and the flight's unique database 105 key as parameters. If the flight is a departure Info_sys passes this request and the flight's key to the Db_flight_dep object 403. If the flight is an arrival Info_sys 402 passes this request and the flight's key to the Db_flight_arr object 404

The prediction subsystem 108 uses landing direction and departure-split to predict runway assignments. To insure that information on flights reflect the current airport configuration the prediction subsystem 108 reassigns runways each time there is a change. The prediction subsystem 108 calculates average taxi-in times and calls Info_sys 402 to store the values in the database 105.

Other methods in Info_sys class 402, Db_flight_dep class 403, and Db_flight_arr class 404 are used by the prediction subsystem 108 to establish a departing flight's position in one of the departure queues.

The prediction subsystem 108 does a recovery when it starts. When Info_sys's method "get next_msg" is invoked the first time, the database 105 mechanism for reading input messages is initialized. This starts the recovery process.

During recovery, un-expired flights are deleted and "Airline_event," "Airline_schedule," "Flightplan," and "Flt_info" input messages about unexpired flights are resent to the prediction subsystem 108. The prediction subsystem 108 processes inputs that have been resent before addressing 'live' inputs from the input_management system 106. In this way the information about active flights that was contained in the prediction subsystem's 108 array of flight objects is 'restored' before processing of 'live' inputs resumes.

The Db_common class 405 provides methods for connecting to the TMS database 105 and for inserting error messages into an error message table. Db_common 405 also provides a method for getting messages from an input pipe table.

Services provided by the database 105 portions of the TMS 100 can be logically divided into two categories:

1. services that minimize the impact of incorrect flight-status inputs on the accuracy of displays; and
2. services that support the needs of the other TMS 100 processes In the TMS 100 a flight is an entity with status and times that are continuously updated until the flight expires. Although a flight can be based initially on inputs from a real-time input source such as radar-tracks or on a flight-plan, most flights are based on status inputs from the Official Airline Guide (OAG) 131 or ARTS Data Gatherer (ADG) 126 (FIG. 1). This initial information is updated by inputs from a Flight Information Display System (FIDS) 127 (FIG. 1), and, later, by real-time sources such as Ramp 128 (FIG. 1), Towers 125, and ADG 126.

Input status data progress from published information having lower fidelity to higher fidelity information. Ultimately, status and times are updated by "firm" information in the form of radar-tracks. This serial progression of flight-status inputs and associated flight-states is a very desirable information flow. The information flow, however, does not occur for all flights, and, the TMS 100 must handle these anomalous information flows. A brief discussion of the range of problems is necessary in order to understanding the challenge presented by these anomalous conditions.

Data feeds from input sources such as ADG 126 or FIDS 127 can be interrupted temporarily. Published schedules that list flights that no longer take place produce erroneous status inputs for these flights. Flight plans for flights that no longer fly may continue to be automatically entered into the FAA's information system where they are picked up by TMS 100. Because of weather, mechanical problems, or other causes flights frequently do not take-off or land at published times. Similarly many cargo, charter, and air-taxi flights do not depart or land as specified in their flight-plans. As a result status inputs on these flights can be incorrect or may reflect information that is not up-to-date. Without additional intelligence incorrect flight information would be displayed and the overall accuracy of the display-lists would be reduced.

To minimize the impact of incorrect status inputs and ensure the highest possible fidelity of flight information these flights need to be removed from display lists until status information of a higher fidelity is received. In one embodiment of the present TMS 100, heuristic assumptions that are intended to minimize the impact of incorrect status inputs were provided by the FAA and implemented by database 105 services and by the prediction subsystem 108.

The design of the TMS 100 places the database 105 in-between the inputs and the monitoring and prediction subsystem 108 segments where it acts as an intermediary. The database 105 is also in-between the monitoring and prediction subsystem 108 side and the client 117 (FIG. 1) side and plays a similar role between the two sides. Lower-level database (105) services required by the major TMS processes are derived from this division of responsibilities. These requirements for database 105 services by the other TMS processes provide a structure for explaining the second role played by the database 105.

The database services required by the TMS 100 processes can be logically divided into four categories:

1. Communicating raw data inputs from automatic data streams and manual inputs to the prediction subsystem 108. Data inputs from automatic data streams and manual inputs are communicated from the Input Management Subsystem (IMS) 106 to the prediction subsystem 108.
2. Providing communications for inter-process management and control. Configuration information is disseminated from the executive subsystem 102 to the other processes. The executive subsystem 102 also sends control command messages to the other TMS processes. The other TMS processes, in turn, respond by sending health and status messages to the executive subsystem 102. User information such as authorization levels is routed to the TMS processes.
3. Support information processing. The flight information displayed by the CIS 110 needs to be identical to that held by the prediction subsystem 108. To this end, a query capability and runway statistics and reports are included.
4. Housekeeping. A security structure and methods for connecting and disconnecting from the database 105 are needed. To this end, an efficient method for cleaning-up input tables is used.

The executive subsystem's 102 interface with the database 105 can be logically divided into three categories:

1. Management and dissemination of configuration information.
2. Sending control commands to the other processes and receiving their responses.
3. Insuring that the correct information exists for the database 105 to generate accurate dates and times.

The TMS 100 configuration information can be logically divided into five categories:

1. TMS 100 operating mode and levels of participation by airlines.
2. Airport-configuration.
3. Sub-systems configurations.
4. Debug levels.
5. User-authorizations.

Through the executive subsystem 102, a system operator 118 can set landing-direction and split. The prediction subsystem 108 uses landing direction and split in formulating the prediction subsystem's 108 and the CIS' 110 runway assignments. When landing direction or split are changed, a "configuration-message" is sent to the prediction subsystem 108 and to the CIS 110.

Process names, status and operating system process-identifier are necessary to control the TMS processes. The executive subsystem 102 adds information about a process to the database 105. Methods for removing a process from the database 105, for updating a process' status, and for updating a process's process-identifier are provided.

The database 105 makes up an informational access and transmittal layer between the input management sub-system 106 and the prediction subsystem 108. Flight information is input into TMS 100.

Input Management Subsystem 106 (FIG. 5)

The input management subsystem (IMS) 106 is a general-purpose means of acquiring the data from various sources 115 (FIG. 1), such as ARTS 126, the tower controller 125, the airlines 130, ramps 128, FIDS 127 and the Official Airline Guide (OAG) 131. The IMS 106 receives passenger display data and is interpreted to extract schedule and gate information. The IMS 106 provides InterFacility Message (IFM) data, including Terminal Radar Approach Control (TRACON) flightplans and associated radar-target data.

The IMS 106 has no direct connection to the database 105, but essential values within the database 105 are directly inherited or derived from data supplied by the IMS 106. In a preferred embodiment, the decision to separate IMS 106 from the database 105 is intentional, since it is part of the IMS 106 design philosophy to run as a realtime daemon, since it must operate on data with internal temporal dependencies. The database 105 is not designed to be a primarily real-time system. As a result, there may be occasional latencies that may be encountered in the database 105. The TMS 100 is designed to automatically recover from these database latencies. One of the design strategies is to run IMS 106 with its own real-time data management system, independent from the state of the database 105. In the event of a TMS 100 and/or database 105 latency, failure, or restart, IMS 106 processing continues unaffected. It should be clear to a person of ordinary skill in the field that, for certain applications, IMS 106 may alternatively be directly connected to the database 105 and/or the database 105 may be designed to be a primarily real-time system.

With reference to FIG. 5, the database (105) components make up an informational access and transmittal layer between the IMS 106 and the prediction subsystem 108. Flight information is read into IMS 106 from the input sources 115, through several programs. The following are five such exemplary programs: "im_oag," "im_dal," "im_vja," "im_fax," and "im_adg."

- im_oag receives and processes a file containing airline schedule information from the Official Airlines Guide (OAG) 131.
- m_dal receives and processes flight schedules and updates from the Airlines 130.
- im_vja receives and processes flight schedules and updates from the Airlines 130.
- im_fax receives and processes flight schedules and updates from the airlines connected via the airport's Flight Information Display System (FIDS) 127.
- datad is a daemon that receives data from ARTS Data Gatherer (ADG) 126. Datad interfaces with FAA systems and provides FAA data, including radar targets, flight plans and other interfacility messages to im_adg.

A matching database access-class for each of the input sources 115 provides a method for sending input messages from the input source to the database 105. This is accomplished by inserting the input messages as rows into corresponding database tables 512, 513, 514, 515, 516 dedicated to particular data sources. Messages containing pointers to rows in the source database table are then inserted into an "input-pipe" table (inp_pipe table) 511, such that when a record or a row is inserted into one of the tables 512, 513, 514, 515, 516, the record or row identification (ID) is inserted into the inp_pipe table 511. The inp_pipe table 511 is one of a pair of alternate tables that is read by Info_sys 402, the prediction subsystem's 108 primary database access class.

Prediction Subsystem 108 (FIG. 6)

The prediction subsystem 108 is responsible for integrating all the input sources 115 connected to TMS 100, monitoring the progress of arriving and departing flights, and predicting when key events will occur. The prediction subsystem 108 processes the following input messages: Airline_schedule, Airline_event, Flight_information, Flight_Plan and Radar, to update the status of flight objects. In addition, it processes airport configuration messages (landing direction, departure split, and flow restrictions) communicated via the executive subsystem 102.

In an exemplary embodiment, the prediction subsystem 108 includes two data files (i.e., AIRCRAFT_TYPES and GATE_TO_RAMP_MAP), and several classes (i.e., Prediction, Flight, Flight_arr, Flight_dep, Flight_arr_pred, Flight_dep_pred, Site, Aircraft, Airport, Runway, Info_sys, Coordinate, Coordinates, Time_interval).

The AIRCRAFT_TYPES data file contains a list of aircraft types, including the FAA designation and the aircraft's weight class. The datafile also includes number of engines, engine type (propeller, jet, turboprop) and the SOIR (Simultaneous Operations on Intersecting Runways; possible values 1–5) group.

The GATE_TO_RAMP_MAP data file contains a list of ramps along with a sub-list of gates associated with each ramp. Since the input sources 115 provide TMS 100 with gate assignments rather than the controller preferred ramp assignments, this file is read in at the prediction subsystem 108 start-up and the correspondences used to infer the ramp for a given gate.

The main class in the prediction subsystem 108 is the Prediction class, which runs the top level control loop and calls the other classes to do the work. The top level loop interacts mostly with the Info_sys class 402 and the executive subsystem class. The Info_sys class 402 is an interface class between the prediction subsystem 108 and the database 105. Its function is to provide the prediction subsystem 108 with the next unprocessed message, translate the database (105) tables to objects that other prediction classes can process, and write any updates from the prediction subsystem 108 to the appropriate database (105) tables 411 (FIG. 4).

With reference to FIG. 6, the prediction subsystem 108 starts at 601 and initializes the following sequence of events at 602:

a) it calls a method of the executive subsystem 102 to inform it that the prediction subsystem 108 is now in a "running" state;
b) it sets-up gate to ramp mapping;
c) it creates the aircraft objects with information about each type of aircraft; and
d) it gets the configuration of the airport and initializes landing direction and split.

The prediction subsystem 108 gets the next input message from the Info_sys 402, at 604. The prediction subsystem 108 then determines the message type at 605. Based on the message type determined at step 605, the prediction subsystem 108 performs alternative processing (or steps) as described below. Possible message types can be divided into three categories: control, status altering messages, and externally generated inputs.

Control messages may be SHUTDOWN, HEARTBEAT, AIRPORT_CONFIG_INFO, EMPTY_PIPE. EMPTY_PIPE control message returns to the top of the loop to get the next message.

If the message type is a SHUTDOWN, the prediction subsystem 108 sends a good-bye message to the executive subsystem 102 and then quits, at 606.

If the message type is a HEARTBEAT request, the prediction subsystem 108 sends a heartbeat to the executive subsystem 102, at 607.

AIRPORT_CONFIG_INFO gets (at step 608) the new landing direction, departure split, and/or flow restrictions from the executive subsystem 102, sets the new values inside the prediction subsystem 108 by calling the appropriate Airport class methods, and then calls Info_sys: (at step 1909) to ask it to put all flights that may be affected by the changes back into the input queue for reprocessing. The message types associated with these possibly affected flights are UPDATE_ARR_FLIGHT and UPDATE_DEP_FLIGHT. When the prediction subsystem 108 receives an UPDATE_ARR_FLIGHT, it calls the Flight class to update the flight's arrival runway (using the new landing direction), re-predict the touchdown if the flight is airborne and within radar range, and update the flight in the database 105 (step 610). For an UPDATE_DEP_FLIGHT, it calls Flight to update the runway (using the new departure split and landing direction), re-predict based on the information provided by the last prediction subsystem 108 source's proposed time, and update the flight in the database 105 (step 611).

Status altering messages may be EXPIRE_ARR_FLIGHT, EXPIRE_DEP_FLIGHT, POSS_GATE, POSS_LANDED, POSS_SUSPEND_DEP_FLIGHT, POSS_SUSPEND_ARR_FLIGHT, POSS_NOT_DEPARTED, POSS_OUTSIDE_TRACON, and are generated by the trkfit process. Trkflt is responsible for searching the arr_flights and dep_lights tables in the database 105 periodically When the prediction subsystem 108 receives an EXPIRE_{ARR|DEP}_FLIGHT message, it deletes the storage in its internal array of flights (step 612) by moving the last flight in the array to the newly freed index (to close the gap just created), and further updates the database 105 (via Info_sys) to reflect the new index of the moved flight, and instructs the database 105 (via Info_sys) to mark the original flight as expired.

POSS_GATE, POSS_LANDED, and POSS_OUTSIDE_TRACON messages are received only for arrival flights, POSS_NOT_DEPARTED is received only for departure flights, and POSS_SUSPEND_{ARR|DEP}_FLIGHT messages are generated by trkflt (step 613) when it determines the flights no longer meet the active flight criteria. When any of these messages is received, the prediction subsystem 108 changes (if necessary) the flight status and then calls Info_sys to write the revised flight to the database. The only case in which Flight class would not be called is if a POSS_GATE message is received for a flight that is already marked as being at the gate. In this case, the prediction subsystem 108 returns without any processing.

The final category of message types are caused by externally generated inputs, including manually entered ones. All inputs (i.e., FLIGHT_PLAN, RADAR, FLIGHT_INFO, AIRLINE_EVENT, and AIRLINE_SCHEDULE) are treated similarly by the prediction subsystem 108.

The prediction subsystem's 108 main responsibility lies with monitoring a flight's status, updating that status (step 614, 615) to reflect input data received and predicting when key events will occur. In order to simplify interactions between the database 105 and the prediction subsystem 108, the prediction subsystem 108 keeps its own arrays for arriving flights and a separate one for departing flights. The arrays have attributes for all information necessary to monitor a flight's status and predict surface situations. The database 105 keeps two corresponding tables, flight_arr and flight_dep, composed of a subset of the attributes known to the prediction subsystem 108. This scheme makes communicating through the database 105 more efficient, keeps tables smaller, and does not require continuous interaction with the database 105 to get a flight's attributes. In addition to storing information about a flight that could be useful to processes down the line from the prediction subsystem 108, the database 105 flight_{arr|dep} tables contain an entry for array index. Whenever a flight is added to the array or moved (because another flight is expired), the database 105 entry is updated. When information arrives to the prediction subsystem 108 via the external inputs type messages, the prediction subsystem 108 looks for the flight to which the information applies, and returns the array index of the flight if it is found and a marker value (i.e., −1) if it is not found.

If an array index of −1 is returned, meaning the flight was not found in the database 105 and therefore is not in the prediction subsystem's 108 internal arrays, the prediction subsystem 108 first determines whether to create a flight. This decision is based on the type of input received. If the input type is Airline_event, the prediction subsystem 108 does not create a flight—that source is known to be unreliable. It instead ignores the input received. For all other input types, a new flight is created, that flight's update method is called to extract and store any useful information, and then the flight is written to the database 105 (via Info_sys) along with its index into the prediction subsystem 108's internal array. Thus, the next time data is received for the same flight, the Info sys will be able to find it in the database 105 and return the index to the prediction subsystem 108.

The prediction subsystem 108 processes the input message (steps 614, 615), by implementing the following tasks:

a) get the call sign from the message, and find the corresponding flight object in the database 105;

b) if the flight object is not found in the database 105, create a new flight;

c) update the flight with the new info just received via the input message;

d) write the updated flight object back to the database 105; and e) If the message is a stub flight message the prediction subsystem 108 looks for the two related flight objects and merges them into a single flight.

The prediction subsystem 108 processes messages from the trkflt process 407 and updates the flight object based on those messages (step 613). The trkfit process 407 monitors the status of flights and issues messages to the prediction subsystem 108 if time has elapsed without the receipt of external input messages.

An embedded knowledge-based system 108 in the prediction subsystem interprets the available inputs received by the input management subsystem 104 and generates "fused" reference data according to the sources' perceived accuracy under the current operating circumstances. Accuracy and reliability are assessed under current operating circumstances based on heuristics obtained in interviews from tower and ramp controllers 128. Higher-accuracy sources are then given greater weight in calculating fused values. Data fusion is necessary because the TMS data sources usually vary (for instance, on departure pushback times) and sometimes are in direct conflict.

Time and trajectory estimation algorithms are used to model airfield operating procedures (runway-to-split assignment, missed approach effects, airfield configuration) and thereby generate advisory data for the FAA tower controllers 125. These advisories cover relative taxi queue times and lengths under alternative airport configurations.

The heuristics used in data fusion and in generating predicted event times comprise an expert system (equivalent to about 100 rules) implemented as C++ methods. Knowledge base updates and revisions have been driven by the results of field testing, and continue with daily operational feedback from users.

In addition, some basic time estimation algorithms are used to calculate arrival time estimates. For instance, the landing time estimate t(R) for a given flight f is defined by Equation (1):

$$t_{n+1}(R) = t_{n+1}(H) + \frac{1}{n}\sum_{m=1}^{n}[t_m(OM) - t_m(H)] + k_r, \quad (1)$$

$$OM < f \leq H$$

$$t_{n+1}(R) = t_{n+1}(OM) + k_r, \quad R < f \leq OM$$

where m=1, ..., n are the n most recent flights past both the terminal area airspace handoff point (H), about 60 nautical mile radius, and the runway outer marker (OM), about 7 nautical mile radius, and kr is a site-defined constant, equal to the typical difference in flight time from the outer marker to landing. When an aircraft must go-around and attempt another landing, the landing time estimate is initially reset to a locally-defined constant $k_m$ (for instance, $k_m$=10 min. in Atlanta), as defined by Equation (2):

$$t_{n+1}(R) = k_m, \, OM < f \quad (2)$$

until the outer marker is reached, then is recalculated as in Equation (1).

Given the lack of airfield ground tracking data, estimated taxi times use an averaging approach, dropping the highest and lowest values over the most-recently-concluded twelve taxiing aircraft. Let the taxi duration for a given flight f be:

$$\Delta t_m = (t_t - t_o) \quad (3)$$

where $t_t$ is the taxi termination time (gate arrival or takeoff) and $t_0$ is the taxi start time (landing or pushback) for a given flight. At any given time t, the estimated taxi time (calculated separately for arrivals and departures) is defined by Equation (4):

$$\Delta t_{p+1} = \frac{1}{p-2}\left[\left(\sum_{m=1}^{p}\Delta t_m\right) - \left(\max_{m=1,\ldots,p}(\Delta t_m) + \min_{m=1,\ldots,p}(\Delta t_m)\right)\right] \quad (4)$$

where 1, ..., p are the most recently concluded taxiing flights. A value of p=12 is typically used by TMS.

However, during periods of light activity (i.e., between arrival/departure "banks" and late at night) the most recently-concluded taxi times may include some flights from hours before. In these cases, when taxi times occurred more than 15 minutes in the past, a (site-defined) minimum taxi time constant $k_t$ is used instead in calculating (4):

$$\Delta t_m = \begin{cases} (t_t - t_0), & \text{if } |t_{p+1} - t_t| < 15 \min \\ k_t, & \text{otherwise} \end{cases} \quad (5)$$

where $k_t$ is the site-defined minimum gate-to-runway taxi time.

CLIENT INTERFACE SUBSYSTEM 110 (FIG. 7)

The Client Interface Subsystem (CIS) 110 delivers flight status data to clients 117 in the form of display screens and a data stream. Clients 117 may choose in which form to receive data from the TMS 100. Clients 117 wishing to receive display screens provide a node connection to the TMS 100 on a local area network or a dial-in modem. Clients 117 wishing to receive a data stream can receive the data in the form of network TCP/IP messages or over a dial-up serial line.

The CIS 110 also receives input data from clients 117 in the form of display requests and flight status updates. The display requests select the information to be displayed on a particular client screen and apply only to that screen. The flight status updates allow controllers to enter information into the TMS 100 concerning individual flights (pushback, gate arrival) and the current airport configuration (departure split, landing direction, etc.)

The screen displays are implemented by three exemplary programs: ci_data 701, ci_user 702, and ci_exec 703. The data stream output is implemented by two programs: ci_srvr 704, and ci_clnt 705. Client input is received as display events by the ci user program 702. The ci_data program 701 fetches flight status data from the database 105 and distributes the data to the screen clients (clients' displays or terminals).

The function of the ci_data program 701 is to provide the screen clients with the current flight information. Each screen client connects to the ci_data program 701 via a known TCP/IP protocol port. The ci_data program 701 synchronously reads flight data from the databases 105 and passes the data without interpretation to all connected client programs. The ci_data program 701 detects when a client connects or disconnects and starts or stops sending the data to the client as appropriate. Inputs to the ci_data program 701 are data from the database 105, command line options and environment variables.

Output data includes the flight status data sent to the client ci_user programs 702 over the socket connections and error messages sent to the operator terminal.

The data processing includes calling an information subsystem. (104) routine that returns 251-byte messages containing flight status and configuration data and sending each message to all connected clients 117. Split and landing direction messages are saved in a buffer for newly-connected clients 117, as these messages are only received when they change. After each complete set of messages has been read, the information subsystem routine will block execution for 20 seconds until the next update period, after which a complete set of data will be sent again.

After each data message has been read, the program checks if any connection requests have arrived from a new client. If a new client is trying to connect, the new client information is recorded into an array and the saved split and landing direction data is sent to the client 117.

The ci_user program 702 provides a graphical user interface to the TMS 100 system. The function of the ci_user program 702 is to display flight data on a screen, update the data continuously as updates are received from the database 105, and accept commands from clients 117 to change the display format and to enter flight status data into the TMS 100.

The ci_user program 702 generates different types of screens with different format, content and functionality depending on the type of user. There are several different types of clients 117: FAA tower controllers 140, airline ramp controllers 141, airlines 142, airport operators 143 and other FAA users or remote users 144. The type of screen generated is specified by a command line argument and is not under the control of the user.

The flight data comes from the ci_data program 701 via a TCP socket connection. The ci_user program 702 also maintains a direct single connection with the database 105 to perform multiple functions. The flight data displayed by the ci_user program 702 is filtered based on the configuration.

Flight status data is received from the ci_data program 701 via a socket. The data includes 251-byte messages containing ASCII text data. The messages include comma-separated fields containing data about departure and arrival flights, airport configuration, and summary data.

Detailed flight information for a client inquiry is fetched directly from the database 105 using a database query for the specific flight.

Client inputs are received as display events when a user touches or clicks on one of the active regions on a display. Each active region on a display is associated with a routine that is called when that region is activated. The routine can then fetch data about the event, if necessary, and enter the data into the TMS 100. All input is done by touches or mouse clicks, as no keyboard input is required to interface with the clients' display monitors. Only FAA tower controllers are allowed to enter departure split and landing direction information.

Outputs of the ci_user program 702 include display commands to the clients' system and user inputs entered into the database 105 for processing.

After the displays have been created and the initial display drawn on the screen, the ci_user program 702 enters an event loop handler, which responds to clients input events or inputs from the ci_data program 701. From then until termination, the ci_user program 702 responds to events, which may be of several types: user-entered actions, system signals, and external inputs. User-entered actions can be touch or click events or keyboard entries. Each such event has an associated callback routine that is invoked when the event occurs, and which then acts on the event.

User events are the result of a user touching or clicking on an active region on a display. The active regions include buttons drawn on the screen, numbers, and items in a list. There are buttons to switch from one screen to another and to draw an overlaying window (pop-up). Pop-up windows are used for: 1) displaying lists of aircraft, 2) displaying graphs, 3) defining a departure split, 4) displaying detailed information about a specific flight, and 5) confirming actions such as exiting the ci_user program 702.

The ci_exec program 703 creates a single instance of the ci_user program 702 and monitors it to ensure that it remains active. The ci_exec program 703 starts the ci_user program 702 and restarts it if needed up to a certain number of times. For FAA tower controller clients 140, the ci_exec program 703 will restart the ci_user program 702 up to 9 times before terminating. Ramp towers 141, airlines 142, and airport operators 143 can terminate their ci_user programs 702 and are therefore not restarted automatically by ci_exec program 703.

The ci_srvr program 704 provides TMS status and schedule data to clients 117 in the form of a data stream. The function of the ci_srvr program 704 is to provide TMS data concerning the status of flights to clients 117. The data is provided as messages over a network socket for clients 117 logged in to the TMS 100. Clients 117 connect to the TMS 100 from a remote host over the network using a predefined socket number. Clients 117 must have a valid user account on the TMS 100 to access the data.

Data may also be provided to a client 117 over a serial line by using a combination of the ci_srvr program 704 and ci_clnt program 705. A client may log in to the TMS 100 and run the ci_clnt program 705. The ci_clnt program 705 connects to the ci_srvr program 704. The ci_clnt program 705 then writes any message received from ci_srvr program 704 to the serial line, after appending check characters for error detection by the client 117.

Not all data is provided to all users 117. Airline users 142 will be sent status data only on those flights that they are allowed to see. However, some users, such as the airport operators 143, will be provided with all of the messages.

A connection to the database 105 is established so that flight status data may be selectively accessed.

Messages are issued by the ci_srvr program 704 once per minute. When the ci_srvr program 704 begins execution, the current time is fetched and rounded up to the next minute for the next update time. Additional update times at 5 min., 15 min., 1 hour, and 4 hours are calculated by rounding up to the next even interval.

The ci_srvr program 704 then enters an indefinite loop of waiting for client connections and transmitting messages to connected clients 117 at specific intervals. If a connection attempt is detected, the client 117 is added to a list of authorized connections. Newly-connected clients will receive a time message containing the current clock time on the TMS 100 and an airport configuration message containing the current landing direction and departure split.

At each update interval, the program queries the database 105 looking for events that have just occurred. At each one-minute update, a time message with the current time is sent to all connected clients 117. This indicates that the TMS 100 is working and allows the clients 117 to synchronize with the TMS 100, if necessary. The airport configuration is checked, and if it has changed since the last update, the new configuration is sent to all clients.

At each one-minute interval, messages are sent for each flight estimated to arrive or depart in the next 10 minutes. For arrivals, the predicted touchdown time is used for the arrival time. For departures, the predicted pushback time is used. At each 5-minute interval, this period is expanded to give the flights predicted to arrive or depart in the next 30 minutes.

The ci_cint program 705 provides TMS status and schedule data to clients 117 via a serial line. The ci_clnt program 705 provides TMS 100 data over a serial line if a client 117 connects to the TMS 100 via dial-up modem. The messages may also be provided as output on a screen if a client 117 is already logged into the TMS 100. The messages are primarily ASCII text, with control characters delineating the start and end of each message. A cyclic redundancy checksum is appended to each message for error detection over unreliable serial lines.

A connection to the ci_srvr program 704 is established. The ci_cint program 705 then enters the main execution loop of reading messages from the ci_srvr program 704, adding a checksum, and writing the messages to the serial line.

While specific embodiments of the present invention have been illustrated and described in accordance with the present invention, modifications and changes of the apparatus, parameters, and composition, use and operation will become apparent to those skilled in the art, without departing from the scope of the invention.

What is claimed is:

1. A data management system comprising:

a server;

a plurality of input sources connected to said server via at least one communication link, for allowing users to input data into said server, said server processing said input data;

a plurality of destination sources connected to said server via said at least one communication link, for allowing users to selectively access said processed data;

said server including:

(a) an autonomous, expert executive subsystem responsible for the tasks comprising: controlling other subsystems, starting and shutting down processes at scheduled times, monitoring system components for error and warning conditions, notifying system support personnel of detected system errors, and recovering from system failures;

(b) an information subsystem, capable of data fusion, responsible for the tasks comprising: integrating other subsystems, communicating traffic raw input data to a prediction subsystem, providing inter-process management and control, processing input and output data to and from said integrated subsystems, processing data fed back from said prediction subsystem, and providing system housekeeping;

(c) an input data management subsystem for providing input data to said information subsystem;

(d) said prediction subsystem for integrating said traffic raw input data from said information subsystem, real-time monitoring of the actual airport or other facility performance, predicting the occurrence of selected events based on said traffic raw input data and actual said airport or other facility performance, and iteratively feeding said prediction data back to said information subsystem; and (e) a client interface subsystem for providing user interface interactions to the system.

2. A data management system according to claim 1, further including a database that stores input data from said input management subsystem and predicted data from said prediction subsystem; and wherein said input data and said predicted data are processed by said information subsystem and are presented to said destination sources in the form of processed data.

3. A data management system according to claim 1, wherein said information subsystem includes a database that stores input data from said input management subsystem and predicted data from said prediction subsystem; and said input data and said predicted data are processed by said information subsystem and are presented to said destination sources in the form of processed data.

4. A method according to claim 1, wherein said prediction system periodically reorganizes arrays of departing and arriving flight objects, such that when a flight object position in an array changes, said prediction subsystem updates said arrays of departing and arriving flight objects to reflect the change.

5. A method according to claim 4 wherein said prediction subsystem uses landing direction and departure split to predict runway assignments.

6. A method according to claim 4, wherein said prediction subsystem revises and reassesses runway and facility assignments for elements in the array of departing and arriving flight objects each time there is a change in the position of said flight objects within said arrays.

7. A data management system according to claim 1, further including an archive file to which data from said database is transferred.

8. A data management system according to claim 1, wherein said autonomous, expert executive subsystem is further responsible for the task of facilitating subsystem debugging.

9. A data management system according to claim 1, wherein said autonomous, expert executive subsystem is further responsible for the task of providing remote access to the system.

10. A data management system according to claim 1, wherein said autonomous, expert executive subsystem is further responsible for the task of maintaining system statistics.

11. A data management system according to claim 1, wherein said autonomous, expert executive subsystem is further responsible for the task of managing user accounts.

12. A data management system according to claim 8, wherein said executive subsystem maintains a system configuration that includes system operation mode, airport configuration parameters, active subsystems identification, subsystem debugging information, and user authorizations.

13. A data management system according to claim 12, wherein said executive subsystem configuration maintains a record for each subsystem that includes an indication of whether each subsystem is active, idle, excluded, or in an error condition.

14. A method for operating a data management system, comprising the steps of:

(a) connecting a plurality of input sources to a server via at least one communication link, for allowing users to input data into said server, said server processing said input data;

(b) connecting a plurality of destination sources to said server via said at least one communication link, for allowing users to selectively access said processed input data;

(c) initiating an autonomous, expert executive subsystem responsible for performing the tasks comprising: controlling other subsystems, starting and shutting down processes at scheduled times, monitoring system components for error and warning conditions, notifying system support personnel of detected system errors, and recovering from system failures;

(d) activating an information subsystem, capable of data fusion, responsible for performing the tasks comprising: integrating other subsystems, communicating traffic raw input data to a prediction subsystem, providing inter-process management and control, processing input and output data to and from said integrated subsystems, processing data fed back from said prediction subsystem, and providing system housekeeping;

(e) activating an input data management subsystem for providing input data to said information subsystem;

(f) initializing said prediction subsystem for integrating said traffic raw input data from said information subsystem, for real-time monitoring of the actual airport or other facility performance, or predicting the occurrence of selected events based on said traffic raw input data and actual said airport or other facility performance, and iteratively feeding said prediction data back to said information subsystem; and (g) initializing a client interface subsystem for providing user interactions to the system.

15. A method according to claim 14, further including the steps of:

storing input data from said input management subsystem and predicted data from said prediction subsystem in a database; and processing said input data and said predicted data by said information subsystem and presenting processed data to said destination sources.

16. A method according to claim 14, wherein said autonomous, expert executive subsystem also facilitates subsystem debugging.

17. A method according to claim 14, wherein said autonomous, expert executive subsystem also provides remote access to system.

18. A method according to claim 14, wherein said autonomous, expert executive subsystem also maintains system statistics.

19. A method according to claim 14, wherein said autonomous, expert executive subsystem also manages user accounts.

20. A method according to claim 14, further including the step of having said prediction subsystem calculate an aircraft landing time estimate t(R) as follows:

$$t_{n+1}(R) = t_{n+1}(H) + \frac{1}{n}\sum_{m=1}^{n}[t_m(OM) - t_m(H)] + k_r, \quad (1)$$

$$OM < f \leq H$$

$$t_{n+1}(R) = t_{n+1}(OM) + k_r, \quad R < f \leq OM$$

where m=1, ..., n are the n most recent flights past a terminal area airspace handoff point (H), and a runway outer marker (OM), and $k_r$ is a site-defined constant equal to a typical difference in time from the outer marker to landing.

21. A method according to claim 20, wherein when an aircraft must go-around and attempt another landing, said prediction subsystem initially resets a landing time to a locally-defined constant km defined as follows $$t_{n+1}(R) = k_m, \quad OM < f \quad (2)$$

until the outer marker is reached, then is recalculated as in Equation (1).

22. A method according to claim 21, wherein said prediction subsystem estimates the taxi duration for a given flight, as follows:

$$\Delta t_m = (t_t - t_0) \quad (3)$$

where $t_t$ is the taxi termination time (gate arrival or takeoff) and $t_0$ is the taxi start time (landing or pushback) for a given flight; and wherein at any given time t, the estimated taxi time (calculated separately for arrivals and departures) is defined as follows:

$$\Delta t_{p+1} = \frac{1}{p-2}\left[\left(\sum_{m=1}^{p}\Delta t_m\right) - \left(\max_{m=1,\ldots,p}(\Delta t_m) + \min_{m=1,\ldots,p}(\Delta t_m)\right)\right] \quad (4)$$

where 1, ..., p are most recently concluded taxiing flights values.

23. A method according to claim 22, wherein during periods of light activity the most recently-concluded taxi times may include some flights from hours before, and when taxi times occurred more than a predetermined period of time in the past, then a minimum taxi time constant $k_t$ is used in calculating equation (4) as follows:

$$\Delta t_m = \begin{cases} (t_t - t_0), & \text{if } |t_{p+1} - t_t| < 15\min \\ k_t, & \text{otherwise} \end{cases} \quad (5)$$

where $t_t$ is the taxi termination time (gate arrival or takeoff) and $t_0$ is the taxi start time (landing or pushback) for a given flight; and wherein at any given time t, the estimated taxi time (calculated separately for arrivals and departures) is defined as follows:

$$\Delta t_{p+1} = \frac{1}{p-2}\left[\left(\sum_{m=1}^{p}\Delta t_m\right) - \left(\max_{m=1,\ldots,p}(\Delta t_m) + \min_{m=1,\ldots,p}(\Delta t_m)\right)\right] \quad (6)$$

where 1, ..., p are most recently concluded taxiing flights values.

24. A method according to claim 15, further including the step of transferring data from said database to an archive file.

25. A method according to claim 15, wherein said prediction subsystem initializes the following sequence of events by:
 (a) calling a method of said executive subsystem to inform said executive subsystem that said prediction subsystem is in a "running" state;
 (b) setting up gate-to-ramp mapping;
 (c) creating aircraft objects having information about each type of aircraft; and
 (d) getting an airport configuration and initializing landing direction and split.

26. A method according to claim 25, wherein said prediction subsystem processes a received input message by sequentially implementing the steps of:
 (a) getting a call sign from said input message, and finding the corresponding flight object in said database;
 (b) creating a new flight object, if said flight object is not found in said database;
 (c) updating said flight with the new information just received via said input message;
 (d) writing the updated flight object back to said database; and
 (e) merging two related flight objects into single flight, if said input message is a stub flight message.

27. A method according to claim 16, wherein said executive subsystem maintains a system configuration that includes system operation mode, airport configuration parameters, active subsystems identification, subsystem debugging information, and user authorizations.

28. A data management system according to claim 27, wherein said executive subsystem configuration maintains a record for each subsystem that includes an indication of whether each subsystem is active, idle, excluded, or in an error condition.

* * * * *